(12) United States Patent
Sakurai et al.

(10) Patent No.: US 12,359,065 B2
(45) Date of Patent: Jul. 15, 2025

(54) MIXED COMPOSITION

(71) Applicant: SUMITOMO CHEMICAL COMPANY, LIMITED, Tokyo (JP)

(72) Inventors: Sayaka Sakurai, Tokyo (JP); Masayoshi Tokuda, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 881 days.

(21) Appl. No.: 17/603,246

(22) PCT Filed: Apr. 1, 2020

(86) PCT No.: PCT/JP2020/015050
§ 371 (c)(1),
(2) Date: Oct. 12, 2021

(87) PCT Pub. No.: WO2020/217904
PCT Pub. Date: Oct. 29, 2020

(65) Prior Publication Data
US 2022/0186028 A1 Jun. 16, 2022

(30) Foreign Application Priority Data

Apr. 23, 2019 (JP) .................................. 2019-081432

(51) Int. Cl.
*C09D 183/16* (2006.01)
*C08L 83/16* (2006.01)

(52) U.S. Cl.
CPC ............ *C08L 83/16* (2013.01); *C09D 183/16* (2013.01); *C08L 2205/025* (2013.01)

(58) Field of Classification Search
CPC ........................... C08L 83/16; C08L 2205/025
See application file for complete search history.

(56) References Cited

U.S. PATENT DOCUMENTS

| 6,346,593 | B1 | 2/2002 | Hupfield et al. | |
|---|---|---|---|---|
| 2010/0041805 | A1 | 2/2010 | Amidaiji et al. | |
| 2010/0168313 | A1 | 7/2010 | Mizuno et al. | |
| 2016/0053056 | A1 | 2/2016 | Gould et al. | |
| 2016/0304745 | A1 | 10/2016 | Iida et al. | |
| 2017/0107381 | A1 | 4/2017 | Hironaga et al. | |
| 2017/0313728 | A1* | 11/2017 | Sakurai .................... | C07F 7/18 |
| 2019/0119502 | A1 | 4/2019 | Sakurai et al. | |
| 2020/0017639 | A1 | 1/2020 | Uehara et al. | |
| 2020/0123327 | A1 | 4/2020 | Sakurai et al. | |

FOREIGN PATENT DOCUMENTS

| CN | 1256284 A | 6/2000 |
|---|---|---|
| CN | 101558129 A | 10/2009 |
| CN | 105229056 A | 1/2016 |
| CN | 106068307 A | 11/2016 |
| CN | 109071817 A | 12/2018 |
| CN | 109071819 A | 12/2018 |
| GB | 947881 A | 1/1964 |
| JP | 64-9268 A | 1/1989 |
| JP | 7-152156 A | 6/1995 |
| JP | 2005-15738 A | 1/2005 |
| JP | 2013-129695 A | 7/2013 |
| JP | 2015-197614 A | 11/2015 |
| JP | 2016-33190 A | 3/2016 |
| JP | 2017-119849 A | 7/2017 |
| JP | 2017-201009 A | 11/2017 |
| JP | 2017-201010 A | 11/2017 |
| JP | 2018-172660 A | 11/2018 |
| WO | WO 2008/081789 A1 | 7/2008 |
| WO | WO 2015/098582 A1 | 7/2015 |

OTHER PUBLICATIONS

International Search Report for PCT/JP2020/015050 mailed on Jun. 30, 2020.
Taiwanese Office Action and Search Report for Taiwanese Application No. 109107880, dated Apr. 11, 2023, with an English translation.
Chinese Office Action and Search Report for Chinese Application No. 202080045564.0, dated Jan. 19, 2023, with an English translation.
Chinese Office Action and Search Report for Chinese Application No. 202080045564.0, dated May 31, 2023, with an English translation.
Japanese Notice of Reasons for Refusal for Japanese Application No. 2020-019046, dated May 23, 2023, with an English translation.

\* cited by examiner

*Primary Examiner* — Catherine S Branch
*Assistant Examiner* — Huihong Qiao
(74) *Attorney, Agent, or Firm* — Birch, Stewart, Kolasch & Birch, LLP

(57) ABSTRACT

A mixed composition containing an organosilicon compound (A) and a silicon compound (B), wherein
the organosilicon compound (A) is an organosilicon compound in which at least one trialkylsilyl group-containing molecular chain and at least one hydrolyzable group are bonded to a silicon atom,
the silicon compound (B) is one or more silicon compounds selected from the group consisting of a silicon compound (b) represented by the following formula (b) and a condensate (bb) thereof, and
in a chromatogram obtained by GPC chromatography of the mixed composition, a weight average molecular weight Mw in terms of standard polystyrene of a compound derived from at least one of the organosilicon compound (A) and the silicon compound (B) is 2000 to 12000, $$Si(X)_p(OR^b)_{4-p} \qquad (b)$$

wherein X is an alkyl group having 1 to 6 carbon atoms or a hydrogen atom, $R^b$ is an alkyl group having 1 to 6 carbon atoms, and p is an integer of 0 to 3.

10 Claims, No Drawings

MIXED COMPOSITION

TECHNICAL FIELD

The present invention relates to a mixed composition containing a plurality of silicon compounds.

BACKGROUND ART

In various display devices, optical elements, semiconductor devices, building materials, automobile parts, nanoimprint technology, and the like, if droplets (in particular, water droplets) adhere to the surface of a base material, the base material can become contaminated or corroded, and moreover problems such as a deterioration in performance caused by such contamination or corrosion can occur. Therefore, in these fields, it is required that the surface of the base material has good liquid repellency, such as water repellency and oil repellency.

Examples of a coating film in which the surface of the base material can have higher liquid repellency include a coating film obtained from a composition in which an organosilicon compound is mixed. For example, Patent Literature 1 discloses an antifouling layer (Y) formed from a composition for forming an antifouling layer that includes a silane compound (A) represented by formula (a) $Si(OR^1)_p(X^1)_{4-p}$ (in which $R^1$ is an alkyl group having 1 to 6 carbon atoms, $X^1$ is a halogen atom, and p is an integer of 0 to 4) and a silane compound (B) represented by formula (b) $R^2Si(OR^3)_q(X^2)_{3-q}$ (in which $R^2$ represents an optionally-substituted alkyl group having 4 to 14 carbon atoms, $R^3$ represents an alkyl group having 1 to 6 carbon atoms, $X^2$ is a halogen atom, and q is an integer of 0 to 3). Further, Patent Document 1 describes that by using antifouling sheet having the antifouling layer (Y) on the surface of an intermediate layer (X) containing a (poly)silazane compound, an antifouling sheet can be provided having an antifouling layer with a good surface state and good curability and having excellent water repellency that enables water droplets to instantly slide down.

CITATION LIST

Patent Literature

Patent Literature 1: International Publication No. 2015/147196

SUMMARY OF INVENTION

Technical Problem

A coating film obtained using a composition in which an organosilicon compound is mixed may be destroyed by friction or the like, and there are cases in which droplets tend to adhere or in which it is difficult to remove adhered droplets.

Therefore, an object of the present invention is to provide a composition capable of realizing a coating film having excellent wear resistance and liquid repellency such as water repellency and oil repellency (particularly water repellency; the same applies hereinafter for liquid repellency).

Solution to Problem

[1] A mixed composition comprising an organosilicon compound (A) and a silicon compound (B), wherein the organosilicon compound (A) is an organosilicon compound in which at least one trialkylsilyl group-containing molecular chain and at least one hydrolyzable group are bonded to a silicon atom, the silicon compound (B) is one or more silicon compounds selected from the group consisting of a silicon compound (b) represented by the following formula (b) and a condensate (bb) thereof, and in a chromatogram obtained by GPC chromatography of the mixed composition, a weight average molecular weight Mw in terms of standard polystyrene of a compound derived from at least one of the organosilicon compound (A) and the silicon compound (B) is 2000 to 12000:

   (b)

wherein X is an alkyl group having 1 to 6 carbon atoms or a hydrogen atom, $R^b$ is an alkyl group having 1 to 6 carbon atoms, and p is an integer of 0 to 3.

[2] The composition according to [1], comprising a compound $(B_z1)$ represented by the following formula (bz).

[Formula 1]

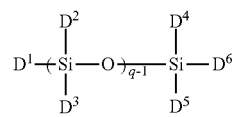   $(b_z)$ wherein $D^1$ and $D^4$ to $D^6$ are each independently an alkyl group having 1 to 6 carbon atoms, a hydrogen atom, a hydroxy group, or an alkoxy group having 1 to 6 carbon atoms, and $D^2$ and $D^3$ are each independently an alkyl group having 1 to 6 carbon atoms, a hydrogen atom, a hydroxy group, an alkoxy group having 1 to 6 carbon atoms, or —O—, when $D^2$ or $D^3$ is —O—, the compound $(B_z1)$ is bonded to a compound $(B_z2)$, which is represented by formula $(b_z)$ and which is different from $(B_z1)$, and the $D^2$ or $D^3$ that is —O— in the compound $(B_z1)$ is directly bonded to Si of $(B_z2)$ instead of any of $D^1$ to $D^6$ of $(B^z2)$, and q is an average number of repetitions.

[3] The composition according to [1] or [2], wherein an area ratio of components having a molecular weight of 5500 or more to the area of the component derived from at least one of the organosilicon compound (A) and the silicon compound (B) in GPC chromatograph measurement of the composition is 75% or less.

[4] The composition according to any one of [1] to [3], wherein a peak area ratio of total alkoxy groups to a peak area of a dimethylsiloxane group in NMR measurement of the mixed composition is 0.020 or more and less than 1.000.

[5] The composition according to any one of [1] to [4], wherein the organosilicon compound (A) is represented by the following formula (a1):

[Formula 2]

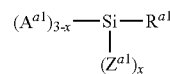   (a1)

wherein each of a plurality of $A^{a1}$ independently represents a hydrolyzable group, $Z^{a1}$ represents a trialkylsilyl group-containing molecular chain, a siloxane skeleton-containing group, or a hydrocarbon chain-containing group.

x is 0 or 1, $R^{a1}$ represents a trialkylsilyl group-containing molecular chain, and a hydrogen atom included in the trialkylsilyl group of $Z^{a1}$ and $R^{a1}$ is optionally replaced by a fluorine atom.

[6] The composition according to [5], wherein the organosilicon compound (A) is represented by the following formula (a2):

[Formula 3]

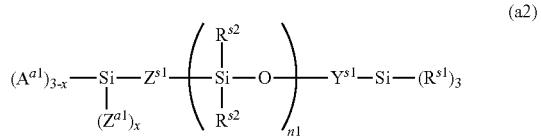
(a2)

wherein $A^{a1}$, $Z^{a1}$, and x each have the same meaning as described above, $Z^{a1}$ represents —O— or a divalent hydrocarbon group, and —CH$_2$— included in the divalent hydrocarbon group is optionally replaced by —O—, each of a plurality of $R^{s2}$ independently represents an alkyl group having 1 to 10 carbon atoms, n1 is an integer of 1 or more, $Y^{s1}$ represents a single bond or —Si(R$^{s2}$)$_2$-L$^{s1}$-, the L$^{s1}$ represents a divalent hydrocarbon group, and —CH$_2$— included in the divalent hydrocarbon group is optionally replaced by —O—, and each of a plurality of $R^{s1}$ independently represents a hydrocarbon group or a trialkylsilyloxy group.

Advantageous Effects of Invention

According to the composition of the present invention, a coating film having excellent wear resistance and liquid repellency can be realized.

DESCRIPTION OF EMBODIMENTS

As described above, the composition of the present invention is a mixed composition containing the organosilicon compound (A) and the silicon compound (B). Hereinafter, the organosilicon compound (A) and the silicon compound (B) will be each be described.

1. Organosilicon Compound (A)

In the organosilicon compound (A) in the present invention, at least one trialkylsilyl group-containing molecular chain and at least one hydrolyzable group are bonded to a silicon atom (hereinafter, this silicon atom is sometimes referred to as the "central silicon atom").

The trialkylsilyl group-containing molecular chain is a monovalent group having a structure in which a trialkylsilyl-containing group is bonded to an end of the molecular chain. As a result of the trialkylsilyl-containing group bonding to the molecular chain, the liquid repellency of the coating film formed from the composition of the present invention is improved. In a preferred embodiment, the presence of the trialkylsilyl group-containing molecular chain reduces friction between droplets (water droplets or the like) and the coating film, facilitates the movement of the droplets, and improves the sliding properties of water droplets. Further, even when the alkyl group of the trialkylsilyl-containing group is replaced by a fluoroalkyl group, the liquid repellency of the coating film interface (surface) can be similarly improved (preferably, the sliding properties of water droplets are further improved).

The number of carbon atoms of the alkyl group (per one alkyl group) included in the trialkylsilyl-containing group is preferably 1 to 4, more preferably 1 to 3, and further preferably 1 or 2.

In the trialkylsilyl group-containing molecular chain, the molecular chain to which the trialkylsilyl-containing group is bonded is preferably a straight chain or a branched chain, and more preferably is a straight chain.

The molecular chain to which the trialkylsilyl-containing group is bonded preferably includes a dialkylsiloxane chain, and more preferably includes a straight dialkylsiloxane chain. Further, the molecular chain including a dialkylsiloxane chain may include a divalent hydrocarbon group. Even if a part of the molecular chain is a divalent hydrocarbon group, the rest is a dialkylsiloxane chain, and therefore the obtained coating film has good chemical and physical durability.

In the organosilicon compound (A), the number of trialkylsilyl group-containing molecular chains bonded to the central silicon atom is 1 or more, and is preferably 3 or less, and more preferably 2 or less. The number of trialkylsilyl group-containing molecular chains bonded to the central silicon atom is particularly preferably 1.

The hydrolyzable group is a group that gives a hydroxy group (is a group that becomes a silanol group by bonding to a silicon atom) by hydrolysis. Preferable examples thereof include an alkoxy group having 1 to 4 carbon atoms, such as a methoxy group, an ethoxy group, a propoxy group, and a butoxy group; a hydroxy group; an acetoxy group; a chlorine atom; an isocyanate group; and the like. Among these, an alkoxy group having 1 to 4 carbon atoms is preferable, and an alkoxy group having 1 or 2 carbon atoms is more preferable.

In the organosilicon compound (A), the number of hydrolyzable groups bonded to the central silicon atom is 1 or more, preferably 2 or more, and is usually 3 or less.

The central silicon atom of the organosilicon compound (A) may have bonded thereto, in addition to the trialkylsilyl group-containing molecular chain and the hydrolyzable group, a siloxane skeleton-containing group (preferably, a siloxane skeleton-containing groups having fewer atoms than the number of atoms constituting the molecular chain of the trialkylsilyl group-containing molecular chain), or a hydrocarbon chain-containing group (preferably, a hydrocarbon chain-containing group containing a hydrocarbon chain having fewer carbon atoms than the number of atoms constituting the molecular chain of the trialkylsilyl group-containing molecular chain). The term hydrocarbon chain-containing group means a group having a hydrocarbon group in at least a part thereof.

The composition of the present invention may use two or more types of the organosilicon compound (A).

Specifically, the organosilicon compound (A) is preferably a compound represented by the following formula (a1).

[Formula 4]

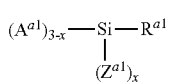
(a1)

In formula (a1), each of a plurality of $A^{a1}$ independently represents a hydrolyzable group, $Z^{a1}$ represents a trialkylsilyl group-containing molecular chain, a siloxane skeleton-containing group, or a hydrocarbon chain-containing group, x is 0 or 1, $R^{a1}$ represents a trialkylsilyl group-containing molecular chain, and a hydrogen atom included in the trialkylsilyl group of $Z^{a1}$ and $R^{a1}$ is optionally replaced by a fluorine atom.

In formula (a1), each of the plurality of $A^{a1}$ may independently be a hydrolyzable group that gives a hydroxy group (group that bonds to a silicon atom to form a silanol group) by hydrolysis. Preferable examples thereof include an alkoxy group having 1 to 4 carbon atoms, such as a methoxy group, an ethoxy group, a propoxy group, and a butoxy group; a hydroxy group; an acetoxy group; a chlorine atom; an isocyanate group; and the like. Among these, an alkoxy group having 1 to 4 carbon atoms is preferable, and an alkoxy group having 1 or 2 carbon atoms is more preferable.

In formula (a1), $R^{a1}$ is a trialkylsilyl group-containing molecular chain, and as described above, is a monovalent group having a structure in which the trialkylsilyl-containing group is bonded to an end of the molecular chain. The trialkylsilyl-containing group is a group that includes at least one trialkylsilyl group, preferably two or more trialkylsilyl groups, and more preferably three trialkylsilyl groups.

The trialkylsilyl-containing group is preferably a group represented by the following formula (s1).

[Formula 5]

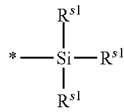

(s1)

In formula (s1), each of a plurality of $R^{s1}$ independently represents a hydrocarbon group or a trialkylsilyloxy group, and a hydrogen atom included in the hydrocarbon group or the trialkylsilyloxy group is optionally replaced by a fluorine atom, and * represents a bond.

In formula (s1), it is preferable that at least one $R^{s1}$ is a trialkylsilyloxy group or all $R^{s1}$s are alkyl groups.

When the $R^{s1}$s are hydrocarbon groups, the number of carbon atoms thereof is preferably 1 to 4, more preferably 1 to 3, and further preferably 1 or 2.

When the $R^{s1}$s are hydrocarbon groups, an aliphatic hydrocarbon group is preferable, and an alkyl group is more preferable. Examples of the alkyl group include a methyl group, an ethyl group, a propyl group, a butyl group, and the like.

The plurality of $R^{s1}$s may be the same or different, but are preferably the same. When all the $R^{a1}$s are hydrocarbon groups (particularly alkyl groups), the total number of carbon atoms of three $R^{s1}$s is preferably 9 or less, more preferably 6 or less, and further preferably 4 or less. It is preferable that at least one of the three $R^{s1}$s is a methyl group, more preferably that at least two are methyl groups, and particularly preferably that all three $R^{s1}$s are methyl groups.

Specific examples of the group (trialkylsilyl group) in which all of the $R^{s1}$s are hydrocarbon groups (alkyl groups) include groups represented by the following formulas. In the formulas, * represents a bond.

[Formula 6]

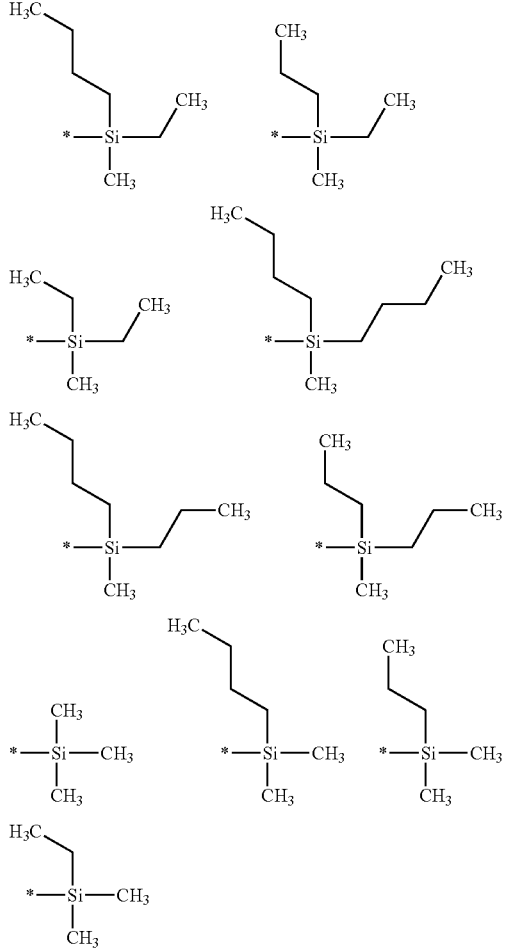

In formula (s1), it is preferable that at least one $R^{s1}$ is a trialkylsilyloxy group.

The term trialkylsilyloxy group means a group in which an oxygen atom is bonded to a silicon atom to which three alkyl groups are bonded (trialkylsilyl group). In formula (s1), it is preferable that two or more $R^{s1}$s are trialkylsilyloxy groups, and more preferably that three $R^{s1}$s are trialkylsilyloxy groups.

Examples of the group in which at least one $R^{s1}$ is a trialkylsilyloxy group include groups represented by the following formulas.

[Formula 7]

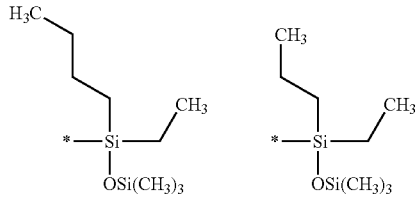

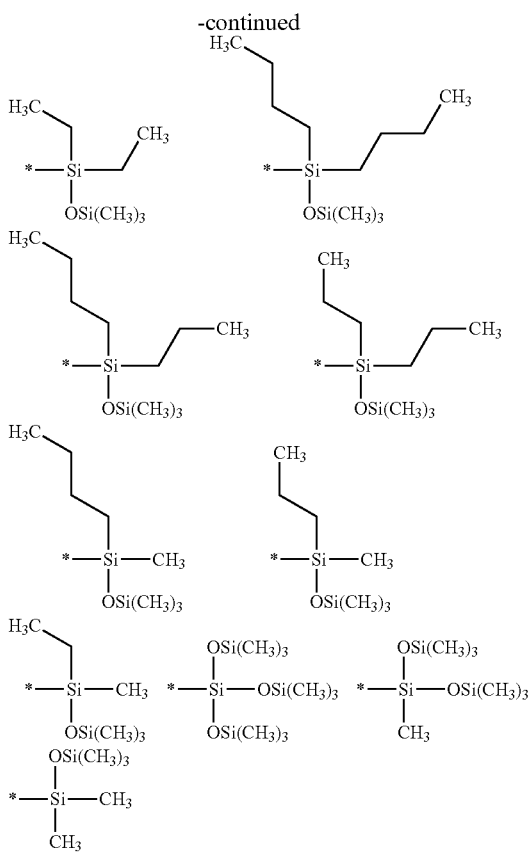

In the trialkylsilyl group-containing molecular chain, the trialkylsilyl-containing group is preferably bonded to an end (free end side) of the molecular chain, and particularly to an end (free end side) of the main chain (longest straight chain) of the molecular chain.

The molecular chain to which the trialkylsilyl-containing group is bonded is preferably a straight or branched chain, and more preferably a straight chain.

The molecular chain to which the trialkylsilyl-containing group is bonded preferably includes a dialkylsiloxane chain, and more preferably a straight dialkylsiloxane chain. Further, the molecular chain including the dialkylsiloxane chain may include a divalent hydrocarbon group. Even if some of the molecular chain are a divalent hydrocarbon group, the rest is a dialkylsiloxane chain, and therefore the obtained coating film has good chemical and physical durability.

The molecular chain to which the trialkylsilyl-containing group is bonded is preferably a group represented by the following formula (s2).

[Formula 8]

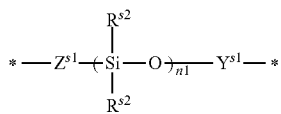

(s2)

In formula (s2), $Z^{s1}$ represents —O— or a divalent hydrocarbon group, —$CH_2$— included in the divalent hydrocarbon group is optionally replaced by —O—, each of a plurality of $R^{s2}$ independently represents an alkyl group having 1 to 10 carbon atoms, n1 is an integer of 1 or more, $Y^{s1}$ represents a single bond or —Si($R^{s2}$)$_2$-$L^{s1}$-, the $L^{s1}$ represents a divalent hydrocarbon group, and —$CH_2$— included in the divalent hydrocarbon group is optionally replaced by —O—. In formula (s2), * on the left side of formula (s2) represents a bond with a central silicon atom, and * on the right side of formula (s2) represents a bond with a trialkylsilyl-containing group.

The number of carbon atoms of the alkyl group represented by $R^{s2}$ is preferably 1 to 4, more preferably 1 to 3, and further preferably 1 or 2.

n1 is preferably an integer of 1 to 100, more preferably an integer of 1 to 80, further preferably an integer of 1 to 50, and particularly preferably an integer of 1 to 30.

The number of carbon atoms of the divalent hydrocarbon group represented by $Z^{s1}$ or $L^{s1}$ is preferably 1 to 10, more preferably 1 to 6, and further preferably 1 to 4. The divalent hydrocarbon group is preferably in the form of a chain, and when it is in the form of a chain, the divalent hydrocarbon group may be in the form of straight or branched chain. The divalent hydrocarbon group is preferably a divalent aliphatic hydrocarbon group, and preferably an alkanediyl group. Examples of the divalent hydrocarbon group include a methylene group, an ethylene group, a propylene group, a butylene group, and the like.

Further, some of the —$CH_2$— included in the divalent hydrocarbon group may be replaced by —O—. In this case, two consecutive —$CH_2$— are not replaced by —O— at the same time, and a —$CH_2$— adjacent to the Si atom is not replaced by —O—. When two or more —$CH_2$— are replaced by —O—, the number of carbon atoms between —O— and —O— is preferably 2 to 4, and more preferably 2 or 3. Specific examples of the group in which some of the divalent hydrocarbon groups are replaced by —O— include a group having a (poly)ethylene glycol unit, a group having a (poly)propylene glycol unit, and the like.

In formula (s2), it is preferable that $Z^{s1}$ is —O— and $Y^{s1}$ is a single bond, that is, the molecular chain consists only of repeating dialkylsilyloxy groups. When the dialkylsiloxane chain consists only of repeating dialkylsilyloxy groups, the obtained coating film has good chemical and physical durability.

Examples of the molecular chain included in the trialkylsilyl group-containing molecular chain include the molecular chains represented by the following formulas. In the following formulas, q1 represents an integer of 1 to 30, and * represents a bond that binds to the central silicon atom or the trialkylsilyl-containing group.

[Formula 9]

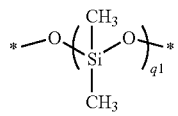

[Formula 10]

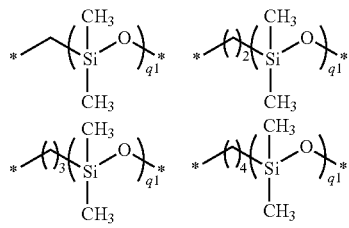

-continued

[Formula 11]

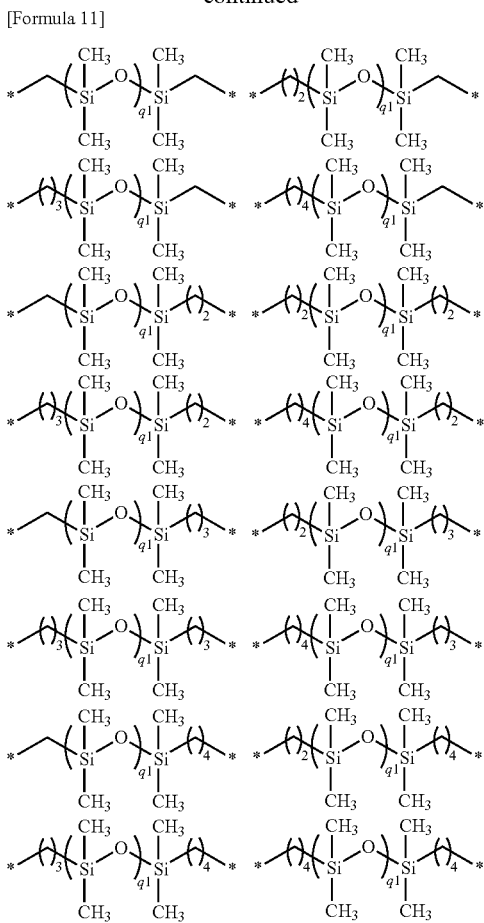

Further, the total number of atoms constituting the trialkylsilyl group-containing molecular chain is preferably 24 or more, more preferably 40 or more, further preferably 50 or more, and much further preferably 100 or more, and is preferably 5000 or less, more preferably 4000 or less, further preferably 2000 or less, still further preferably 1200 or less, even further preferably 700 or less, particularly preferably 400 or less, and most preferably 250 or less.

The trialkylsilyl group-containing molecular chain is preferably a group represented by the following formula (s3).

[Formula 12]

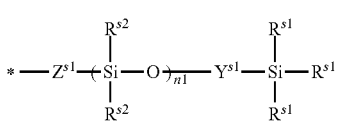

(s3)

In formula (s3), $Z^{s1}$, $R^{s2}$, n1, $Y^{s1}$, and $R^{s1}$ have the same meaning as described above, and * represents a bond with the central silicon atom.

The trialkylsilyl group-containing molecular chain is preferably a group represented by the following formula (s3-1) or the following formula (s3-2), and more preferably a group represented by the following formula (s3-2).

When the trialkylsilyl group-containing molecular chain is represented by the following formula (s3-1), a group represented by the following formula (s3-1-1) is more preferable.

[Formula 13]

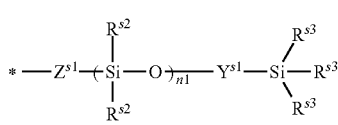

(s3-1)

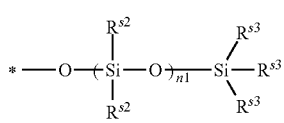

(s3-1-1)

In formula (s3-1) and formula (s3-1-1), $Z^{s1}$, $R^{s2}$, n1, and $Y^{s1}$ have the same meaning as described above, $R^{s3}$ represents an alkyl group having 1 to 4 carbon atoms, and * represents a bond with the central silicon atom.

The number of carbon atoms of the alkyl group represented by $R^{s3}$ is preferably 1 to 3, and more preferably 1 or 2. Further, in formula (s3-1) and formula (s3-1-1), the total number of carbon atoms of the $R^{s3}$ included in —Si($R^{s3}$)$_3$ is preferably 9 or less, more preferably 6 or less, and further preferably 4 or less. In addition, of the $R^{s3}$s included in —Si($R^{s3}$)$_3$, it is preferable that at least one is a methyl group, more preferable that two or more $R^{s3}$s are methyl groups, and particularly preferable that all three $R^{s3}$s are methyl groups.

When the trialkylsilyl group-containing molecular chain is represented by the following formula (s3-2), a group represented by the following formula (s3-2-1) is more preferable.

[Formula 14]

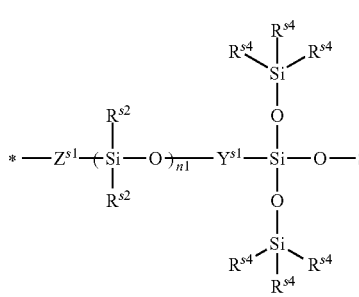

(s3-2)

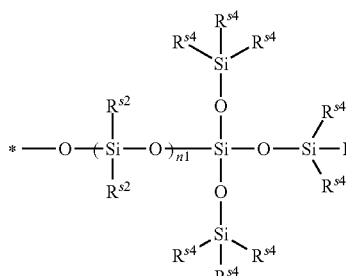

(s3-2-1)

In formula (s3-2) and formula (s3-2-1), $Z^{s1}$, $R^{s2}$, n1, and $Y^{s1}$ have the same meaning as described above, $R^{s4}$ represents an alkyl group having 1 to 4 carbon atoms, and * represents a bond with the central silicon atom.

The number of carbon atoms of the alkyl group represented by $R^{s4}$ is preferably 1 to 3, and more preferably 1 or 2. Further, the total number of carbon atoms of the $R^{s4}$ included in *—Si($R^{s4}$)$_3$ is preferably 9 or less, more preferably 6 or less, and further preferably 4 or less. In addition, of the $R^{s4}$s included in *—Si($R^{s4}$)$_3$, it is preferable that at least one $R^{s4}$ is a methyl group, more preferable that two or more $R^{s4}$s are methyl groups, and particularly preferable that all three $R^{s4}$s are methyl groups.

Specific examples of the trialkylsilyl group-containing molecular chain include a group represented by the following formula (s3-I).

[Formula 15]

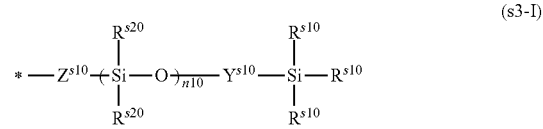

(s3-I)

In formula (s3-I), * represents a bond with the central silicon atom.

In formula (s3-I), $Z^{s10}$, $R^{s20}$, n10, $Y^{s10}$, and $R^{s10}$ are preferably combined as shown in Tables 1 and 2 below.

TABLE 1

|  | $Z^{s10}$ | $R^{s20}$ | n10 | $Y^{s10}$ | $R^{s10}$ |
|---|---|---|---|---|---|
| (s3-I-1) | *—O—* | CH$_3$—* | 1~60 | — | (CH$_3$)$_3$SiO—* |
| (s3-I-2) | *—O—* | CH$_3$—* | 1~60 | *—Si(CH$_3$)$_2$—CH$_2$—* | (CH$_3$)$_3$SiO—* |
| (s3-I-3) | *—O—* | CH$_3$—* | 1~60 | *—Si(CH$_3$)$_2$—(CH$_2$)$_2$—* | (CH$_3$)$_3$SiO—* |
| (s3-I-4) | *—O—* | CH$_3$—* | 1~60 | *—Si(CH$_3$)$_2$—(CH$_2$)$_3$—* | (CH$_3$)$_3$SiO—* |
| (s3-I-5) | *—O—* | CH$_3$—* | 1~60 | *—Si(CH$_3$)$_2$—(CH$_2$)$_4$—* | (CH$_3$)$_3$SiO—* |
| (s3-I-6) | *—CH$_2$—* | CH$_3$—* | 1~60 | — | (CH$_3$)$_3$SiO—* |
| (s3-I-7) | *—CH$_2$—* | CH$_3$—* | 1~60 | *—Si(CH$_3$)$_2$—CH$_2$—* | (CH$_3$)$_3$SiO—* |
| (s3-I-8) | *—CH$_2$—* | CH$_3$—* | 1~60 | *—Si(CH$_3$)$_2$—(CH$_2$)$_2$—* | (CH$_3$)$_3$SiO—* |
| (s3-I-9) | *—CH$_2$—* | CH$_3$—* | 1~60 | *—Si(CH$_3$)$_2$—(CH$_2$)$_3$—* | (CH$_3$)$_3$SiO—* |
| (s3-I-10) | *—CH$_2$—* | CH$_3$—* | 1~60 | *—Si(CH$_3$)$_2$—(CH$_2$)$_4$—* | (CH$_3$)$_3$SiO—* |
| (s3-I-11) | *—(CH$_2$)$_2$—* | CH$_3$—* | 1~60 | — | (CH$_3$)$_3$SiO—* |
| (s3-I-12) | *—(CH$_2$)$_2$—* | CH$_3$—* | 1~60 | *—Si(CH$_3$)$_2$—CH$_2$—* | (CH$_3$)$_3$SiO—* |
| (s3-I-13) | *—(CH$_2$)$_2$—* | CH$_3$—* | 1~60 | *—Si(CH$_3$)$_2$—(CH$_2$)$_2$—* | (CH$_3$)$_3$SiO—* |
| (s3-I-14) | *—(CH$_2$)$_2$—* | CH$_3$—* | 1~60 | *—Si(CH$_3$)$_2$—(CH$_2$)$_3$—* | (CH$_3$)$_3$SiO—* |
| (s3-I-15) | *—(CH$_2$)$_2$—* | CH$_3$—* | 1~60 | *—Si(CH$_3$)$_2$—(CH$_2$)$_4$—* | (CH$_3$)$_3$SiO—* |
| (s3-I-16) | *—(CH$_2$)$_3$—* | CH$_3$—* | 1~60 | — | (CH$_3$)$_3$SiO—* |
| (s3-I-17) | *—(CH$_2$)$_3$—* | CH$_3$—* | 1~60 | *—Si(CH$_3$)$_2$—CH$_2$—* | (CH$_3$)$_3$SiO—* |
| (s3-I-18) | *—(CH$_2$)$_3$—* | CH$_3$—* | 1~60 | *—Si(CH$_3$)$_2$—(CH$_2$)$_2$—* | (CH$_3$)$_3$SiO—* |
| (s3-I-19) | *—(CH$_2$)$_3$—* | CH$_3$—* | 1~60 | *—Si(CH$_3$)$_2$—(CH$_2$)$_3$—* | (CH$_3$)$_3$SiO—* |
| (s3-I-20) | *—(CH$_2$)$_3$—* | CH$_3$—* | 1~60 | *—Si(CH$_3$)$_2$—(CH$_2$)$_4$—* | (CH$_3$)$_3$SiO—* |
| (s3-I-21) | *—(CH$_2$)$_4$—* | CH$_3$—* | 1~60 | — | (CH$_3$)$_3$SiO—* |
| (s3-I-22) | *—(CH$_2$)$_4$—* | CH$_3$—* | 1~60 | *—Si(CH$_3$)$_2$—CH$_2$—* | (CH$_3$)$_3$SiO—* |
| (s3-I-23) | *—(CH$_2$)$_4$—* | CH$_3$—* | 1~60 | *—Si(CH$_3$)$_2$—(CH$_2$)$_2$—* | (CH$_3$)$_3$SiO—* |
| (s3-I-24) | *—(CH$_2$)$_4$—* | CH$_3$—* | 1~60 | *—Si(CH$_3$)$_2$—(CH$_2$)$_3$—* | (CH$_3$)$_3$SiO—* |
| (s3-I-25) | *—(CH$_2$)$_4$—* | CH$_3$—* | 1~60 | *—Si(CH$_3$)$_2$—(CH$_2$)$_4$—* | (CH$_3$)$_3$SiO—* |

TABLE 2

|  | $Z^{s10}$ | $R^{s20}$ | n10 | $Y^{s10}$ | $R^{s10}$ |
|---|---|---|---|---|---|
| (s3-I-26) | *—O—* | CH$_3$—* | 1~60 | — | CH$_3$—* |
| (s3-I-27) | *—O—* | CH$_3$—* | 1~60 | *—Si(CH$_3$)$_2$—CH$_2$—* | CH$_3$—* |
| (s3-I-28) | *—O—* | CH$_3$—* | 1~60 | *—Si(CH$_3$)$_2$—(CH$_2$)$_2$—* | CH$_3$—* |
| (s3-I-29) | *—O—* | CH$_3$—* | 1~60 | *—Si(CH$_3$)$_2$—(CH$_2$)$_3$—* | CH$_3$—* |
| (s3-I-30) | *—O—* | CH$_3$—* | 1~60 | *—Si(CH$_3$)$_2$—(CH$_2$)$_4$—* | CH$_3$—* |
| (s3-I-31) | *—CH$_2$—* | CH$_3$—* | 1~60 | — | CH$_3$—* |
| (s3-I-32) | *—CH$_2$—* | CH$_3$—* | 1~60 | *—Si(CH$_3$)$_2$—CH$_2$—* | CH$_3$—* |
| (s3-I-33) | *—CH$_2$—* | CH$_3$—* | 1~60 | *—Si(CH$_3$)$_2$—(CH$_2$)$_2$—* | CH$_3$—* |
| (s3-I-34) | *—CH$_2$—* | CH$_3$—* | 1~60 | *—Si(CH$_3$)$_2$—(CH$_2$)$_3$—* | CH$_3$—* |
| (s3-I-35) | *—CH$_2$—* | CH$_3$—* | 1~60 | *—Si(CH$_3$)$_2$—(CH$_2$)$_4$—* | CH$_3$—* |
| (s3-I-36) | *—(CH$_2$)$_2$—* | CH$_3$—* | 1~60 | — | CH$_3$—* |
| (s3-I-37) | *—(CH$_2$)$_2$—* | CH$_3$—* | 1~60 | *—Si(CH$_3$)$_2$—CH$_2$—* | CH$_3$—* |
| (s3-I-38) | *—(CH$_2$)$_2$—* | CH$_3$—* | 1~60 | *—Si(CH$_3$)$_2$—(CH$_2$)$_2$—* | CH$_3$—* |
| (s3-I-39) | *—(CH$_2$)$_2$—* | CH$_3$—* | 1~60 | *—Si(CH$_3$)$_2$—(CH$_2$)$_3$—* | CH$_3$—* |
| (s3-I-40) | *—(CH$_2$)$_2$—* | CH$_3$—* | 1~60 | *—Si(CH$_3$)$_2$—(CH$_2$)$_4$—* | CH$_3$—* |
| (s3-I-41) | *—(CH$_2$)$_3$—* | CH$_3$—* | 1~60 | — | CH$_3$—* |
| (s3-I-42) | *—(CH$_2$)$_3$—* | CH$_3$—* | 1~60 | *—Si(CH$_3$)$_2$—CH$_2$—* | CH$_3$—* |
| (s3-I-43) | *—(CH$_2$)$_3$—* | CH$_3$—* | 1~60 | *—Si(CH$_3$)$_2$—(CH$_2$)$_2$—* | CH$_3$—* |
| (s3-I-44) | *—(CH$_2$)$_3$—* | CH$_3$—* | 1~60 | *—Si(CH$_3$)$_2$—(CH$_2$)$_3$—* | CH$_3$—* |
| (s3-I-45) | *—(CH$_2$)$_3$—* | CH$_3$—* | 1~60 | *—Si(CH$_3$)$_2$—(CH$_2$)$_4$—* | CH$_3$—* |
| (s3-I-46) | *—(CH$_2$)$_4$—* | CH$_3$—* | 1~60 | — | CH$_3$—* |
| (s3-I-47) | *—(CH$_2$)$_4$—* | CH$_3$—* | 1~60 | *—Si(CH$_3$)$_2$—CH$_2$—* | CH$_3$—* |
| (s3-I-48) | *—(CH$_2$)$_4$—* | CH$_3$—* | 1~60 | *—Si(CH$_3$)$_2$—(CH$_2$)$_2$—* | CH$_3$—* |
| (s3-I-49) | *—(CH$_2$)$_4$—* | CH$_3$—* | 1~60 | *—Si(CH$_3$)$_2$—(CH$_2$)$_3$—* | CH$_3$—* |
| (s3-I-50) | *—(CH$_2$)$_4$—* | CH$_3$—* | 1~60 | *—Si(CH$_3$)$_2$—(CH$_2$)$_4$—* | CH$_3$—* |

In (s3-I-1) to (s3-I-50), n10 is more preferably an integer of 2 or more, and further preferably an integer of 3 or more, and is preferably an integer of 50 or less, more preferably an integer of 40 or less, much further preferably an integer of 30 or less, and most preferably an integer of 25 or less.

Further, in formula (a1), $Z^{a1}$ represents a trialkylsilyl group-containing molecular chain, a siloxane skeleton-containing group, or a hydrocarbon chain-containing group.

When $Z^{a1}$ is a trialkylsilyl group-containing molecular chain, examples may include the same as those described above for $R^{a1}$.

When $Z^{a1}$ is a siloxane skeleton-containing group, it is preferable that the siloxane skeleton-containing group be a monovalent group containing a siloxane unit (Si—O—), and be constituted from a fewer number of atoms than the number of atoms constituting the trialkylsilyl group-containing molecular chain of $R^{a1}$. As a result, the siloxane skeleton-containing group becomes a group having a shorter length or a smaller steric size (bulk) than the trialkylsilyl group-containing molecular chain. The siloxane skeleton-containing group may include a divalent hydrocarbon group.

The siloxane skeleton-containing group is preferably a group represented by the following formula (s4).

[Formula 16]

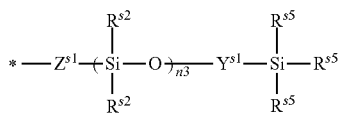

(s4)

In formula (s4), $Z^{s1}$, $R^{s2}$, and $Y^{s1}$ have the same meaning as described above. $R^{s5}$ represents a hydrocarbon group or a hydroxy group, the —CH$_2$— included in the hydrocarbon group are optionally replaced by —O—, a hydrogen atom included in the hydrocarbon group is optionally replaced by a fluorine atom, n3 represents an integer of 0 to 5, and * represents a bond with the central silicon atom.

Examples of the hydrocarbon group represented by $R^{s5}$ include the same groups as those of the hydrocarbon group represented by $R^{s1}$. Preferably, the hydrocarbon group is an aliphatic hydrocarbon group, and more preferably an alkyl group.

The number of carbon atoms of the hydrocarbon group represented by $R^{s5}$ is preferably 1 to 4, more preferably 1 to 3, and further preferably 1 or 2.

n3 is preferably an integer of 1 to 5, and more preferably an integer of 1 to 3.

The total number of atoms of the siloxane skeleton-containing group is preferably 600 or less, more preferably 500 or less, further preferably 350 or less, still further preferably 100 or less, much further preferably 50 or less, and still much further preferably 30 or less, and is preferably 10 or more. The difference in the number of atoms between the trialkylsilyl group-containing molecular chain of $R^{a1}$ and the siloxane skeleton-containing group of $Z^{a1}$ is preferably 10 or more, and more preferably 20 or more, and is preferably 1000 or less, more preferably 500 or less, and further preferably 200 or less.

Specific examples of the siloxane skeleton-containing group include a group represented by the following formula.

[Formula 17]

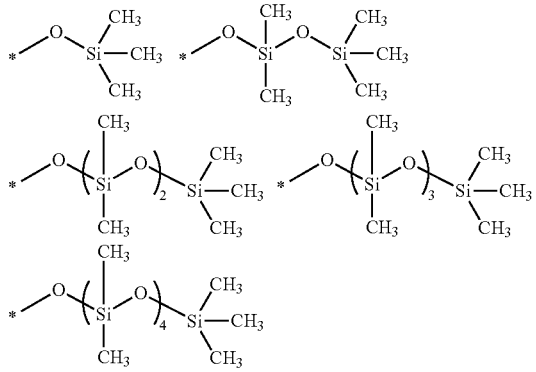

When $Z^{a1}$ is a hydrocarbon chain-containing group, it is preferable that the number of carbon atoms of the hydrocarbon chain moiety is fewer than the number of atoms constituting the molecular chain of the trialkylsilyl group-containing molecular chain. Further, it is preferable that the number of carbon atoms of the longest straight chain of the hydrocarbon chain is fewer than the number of atoms constituting the longest straight chain of the trialkylsilyl group-containing molecular chain. Usually, the hydrocarbon chain-containing group is composed of only hydrocarbon groups (hydrocarbon chains), but if necessary, the hydrocarbon chain-containing group may be a group in which some of the methylene groups (—CH$_2$—) of the hydrocarbon chain are replaced by oxygen atoms. Further, a methylene group (—CH$_2$—) adjacent to the Si atom is not replaced by an oxygen atom, and two consecutive methylene groups (—CH$_2$—) are not replaced by oxygen atoms at the same time.

The number of carbon atoms of the hydrocarbon chain moiety means, for a non-oxygen-substituted hydrocarbon chain-containing group, the number of carbon atoms constituting the hydrocarbon group (hydrocarbon chain), and for an oxygen-substituted hydrocarbon chain-containing group, the number of carbon atoms constituting the hydrocarbon group (hydrocarbon chain) counted by assuming that the oxygen atoms methylene groups (—CH$_2$—).

Hereinafter, unless otherwise specified, the hydrocarbon chain-containing group is described based on the example of a non-oxygen-substituted hydrocarbon chain-containing group (that is, a monovalent hydrocarbon group) as an example, but in the entire description below, it is possible to replace some of the methylene groups —CH$_2$— by oxygen atoms.

When the hydrocarbon chain-containing group is a hydrocarbon group, the hydrocarbon chain-containing group preferably has 1 or more and 3 or less carbon atoms, and more preferably 1 carbon atom. Further, the hydrocarbon chain-containing group may be a branched chain or a straight chain. The hydrocarbon chain-containing group is preferably a saturated or unsaturated aliphatic hydrocarbon chain-containing group, and more preferably a saturated aliphatic hydrocarbon chain-containing group. As the saturated aliphatic hydrocarbon chain-containing group, a saturated aliphatic hydrocarbon group is more preferable. Examples of the saturated aliphatic hydrocarbon group include a methyl group, an ethyl group, a propyl group, and the like.

When some of the methylene groups (—CH$_2$—) of the saturated aliphatic hydrocarbon group are replaced by oxygen atoms, specific examples include a group having a (poly)ethylene glycol unit.

In formula (a1), x is preferably 0.

The organosilicon compound (A) is preferably a compound represented by the following formula (a2).

[Formula 18]

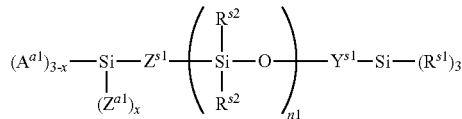
(a2)

In formula (a2), $A^{a1}$, $Z^{a1}$, x, $Z^{s1}$, $R^{s2}$, n1, $Y^{s1}$, and $R^{s1}$ each have the same meaning as described above.

In formula (a2), n1 is preferably an integer of 1 to 60, is more preferably an integer of 2 or more, and further preferably an integer of 3 or more, and is preferably an integer of 50 or less, more preferably an integer of 40 or less, particularly preferably an integer of 30 or less, and most preferably an integer of 25 or less.

The organosilicon compound (A) represented by formula (a2) is preferably represented by the following formula (a2-1) or the following formula (a2-2), and more preferably is represented by the following formula (a2-2), When the organosilicon compound (A) represented by formula (a2) is represented by the following formula (a2-1), a compound represented by the following formula (a2-1-1) is more preferable.

[Formula 19]

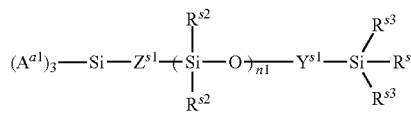

In formula (a2-1) and formula (a2-1-1), $A^{a1}$, $Z^{s1}$, $R^{s2}$, n1, $Y^{s1}$, and $R^{s3}$ have the same meaning as described above.

When the organosilicon compound (A) represented by formula (a2) is represented by the following formula (a2-2), a compound represented by the following formula (a2-2-1) is more preferable.

[Formula 20]

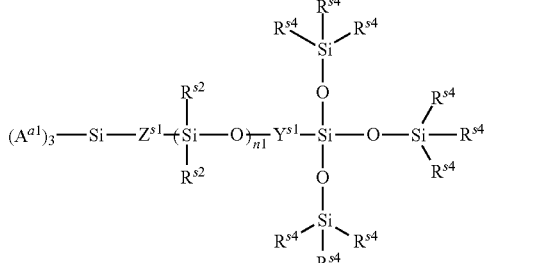

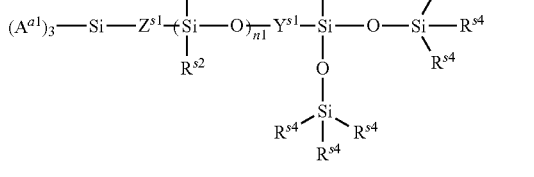

In formula (a2-2) and formula (a2-2-1), $A^{a1}$, $Z^{s1}$, $R^{s2}$, n1, $Y^{s1}$, and $R^{s4}$ have the same meaning as described above.

Specific examples of the organosilicon compound (A) represented by formula (a2) include compounds represented by formula (A-I).

[Formula 21]

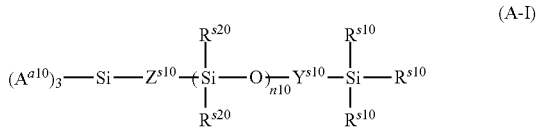
(A-I)

In formula (A-I), $A^{a10}$, $Z^{s10}$, $R^{s20}$, n10, $Y^{s10}$, and $R^{s10}$ are preferably combined as shown in Tables 3-1, 3-2, 4-1, and 4-2 below.

TABLE 3-1

| | $A^{a10}$ | $Z^{s10}$ | $R^{s20}$ | n10 | $Y^{s10}$ | $R^{s10}$ |
|---|---|---|---|---|---|---|
| (A-I-1) | $C_2H_5O-*$ | $*-O-*$ | $CH_3-*$ | 1~60 | — | $(CH_3)_3SiO-*$ |
| (A-I-2) | $C_2H_5O-*$ | $*-O-*$ | $CH_3-*$ | 1~60 | $*-Si(CH_3)_2-CH_2-*$ | $(CH_3)_3SiO-*$ |
| (A-I-3) | $C_2H_5O-*$ | $*-O-*$ | $CH_3-*$ | 1~60 | $*-Si(CH_3)_2-(CH_2)_2-*$ | $(CH_3)_3SiO-*$ |
| (A-I-4) | $C_2H_5O-*$ | $*-O-*$ | $CH_3-*$ | 1~60 | $*-Si(CH_3)_2-(CH_2)_3-*$ | $(CH_3)_3SiO-*$ |
| (A-I-5) | $C_2H_5O-*$ | $*-O-*$ | $CH_3-*$ | 1~60 | $*-Si(CH_3)_2-(CH_2)_4-*$ | $(CH_3)_3SiO-*$ |
| (A-I-6) | $C_2H_5O-*$ | $*-CH_2-*$ | $CH_3-*$ | 1~60 | — | $(CH_3)_3SiO-*$ |
| (A-I-7) | $C_2H_5O-*$ | $*-CH_2-*$ | $CH_3-*$ | 1~60 | $*-Si(CH_3)_2-CH_2-*$ | $(CH_3)_3SiO-*$ |
| (A-I-8) | $C_2H_5O-*$ | $*-CH_2-*$ | $CH_3-*$ | 1~60 | $*-Si(CH_3)_2-(CH_2)_2-*$ | $(CH_3)_3SiO-*$ |
| (A-I-9) | $C_2H_5O-*$ | $*-CH_2-*$ | $CH_3-*$ | 1~60 | $*-Si(CH_3)_2-(CH_2)_3-*$ | $(CH_3)_3SiO-*$ |
| (A-I-10) | $C_2H_5O-*$ | $*-CH_2-*$ | $CH_3-*$ | 1~60 | $*-Si(CH_3)_2-(CH_2)_4-*$ | $(CH_3)_3SiO-*$ |
| (A-I-11) | $C_2H_5O-*$ | $*-(CH_2)_2-*$ | $CH_3-*$ | 1~60 | — | $(CH_3)_3SiO-*$ |
| (A-I-12) | $C_2H_5O-*$ | $*-(CH_2)_2-*$ | $CH_3-*$ | 1~60 | $*-Si(CH_3)_2-CH_2-*$ | $(CH_3)_3SiO-*$ |
| (A-I-13) | $C_2H_5O-*$ | $*-(CH_2)_2-*$ | $CH_3-*$ | 1~60 | $*-Si(CH_3)_2-(CH_2)_2-*$ | $(CH_3)_3SiO-*$ |
| (A-I-14) | $C_2H_5O-*$ | $*-(CH_2)_2-*$ | $CH_3-*$ | 1~60 | $*-Si(CH_3)_2-(CH_2)_3-*$ | $(CH_3)_3SiO-*$ |
| (A-I-15) | $C_2H_5O-*$ | $*-(CH_2)_2-*$ | $CH_3-*$ | 1~60 | $*-Si(CH_3)_2-(CH_2)_4-*$ | $(CH_3)_3SiO-*$ |
| (A-I-16) | $C_2H_5O-*$ | $*-(CH_2)_3-*$ | $CH_3-*$ | 1~60 | — | $(CH_3)_3SiO-*$ |

TABLE 3-1-continued

|  | $A^{a10}$ | $Z^{s10}$ | $R^{s20}$ | n10 | $Y^{s10}$ | $R^{s10}$ |
|---|---|---|---|---|---|---|
| (A-I-17) | $C_2H_5O$—* | *—$(CH_2)_3$—* | $CH_3$—* | 1~60 | *—$Si(CH_3)_2$—$CH_2$—* | $(CH_3)_3SiO$—* |
| (A-I-18) | $C_2H_5O$—* | *—$(CH_2)_3$—* | $CH_3$—* | 1~60 | *—$Si(CH_3)_2$—$(CH_2)_2$—* | $(CH_3)_3SiO$—* |
| (A-I-19) | $C_2H_5O$—* | *—$(CH_2)_3$—* | $CH_3$—* | 1~60 | *—$Si(CH_3)_2$—$(CH_2)_3$—* | $(CH_3)_3SiO$—* |
| (A-I-20) | $C_2H_5O$—* | *—$(CH_2)_3$—* | $CH_3$—* | 1~60 | *—$Si(CH_3)_2$—$(CH_2)_4$—* | $(CH_3)_3SiO$—* |
| (A-I-21) | $C_2H_5O$—* | *—$(CH_2)_4$—* | $CH_3$—* | 1~60 | — | $(CH_3)_3SiO$—* |
| (A-I-22) | $C_2H_5O$—* | *—$(CH_2)_4$—* | $CH_3$—* | 1~60 | *—$Si(CH_3)_2$—$CH_2$—* | $(CH_3)_3SiO$—* |
| (A-I-23) | $C_2H_5O$—* | *—$(CH_2)_4$—* | $CH_3$—* | 1~60 | *—$Si(CH_3)_2$—$(CH_2)_2$—* | $(CH_3)_3SiO$—* |
| (A-I-24) | $C_2H_5O$—* | *—$(CH_2)_4$—* | $CH_3$—* | 1~60 | *—$Si(CH_3)_2$—$(CH_2)_3$—* | $(CH_3)_3SiO$—* |
| (A-I-25) | $C_2H_5O$—* | *—$(CH_2)_4$—* | $CH_3$—* | 1~60 | *—$Si(CH_3)_2$—$(CH_2)_4$—* | $(CH_3)_3SiO$—* |

TABLE 3-2

|  | $A^{a10}$ | $Z^{s10}$ | $R^{s20}$ | n10 | $Y^{s10}$ | $R^{s10}$ |
|---|---|---|---|---|---|---|
| (A-I-26) | $CH_3O$—* | *—O—* | $CH_3$—* | 1~60 | — | $(CH_3)_3SiO$—* |
| (A-I-27) | $CH_3O$—* | *—O—* | $CH_3$—* | 1~60 | *—$Si(CH_3)_2$—$CH_2$—* | $(CH_3)_3SiO$—* |
| (A-I-28) | $CH_3O$—* | *—O—* | $CH_3$—* | 1~60 | *—$Si(CH_3)_2$—$(CH_2)_2$—* | $(CH_3)_3SiO$—* |
| (A-I-29) | $CH_3O$—* | *—O—* | $CH_3$—* | 1~60 | *—$Si(CH_3)_2$—$(CH_2)_3$—* | $(CH_3)_3SiO$—* |
| (A-I-30) | $CH_3O$—* | *—O—* | $CH_3$—* | 1~60 | *—$Si(CH_3)_2$—$(CH_2)_4$—* | $(CH_3)_3SiO$—* |
| (A-I-31) | $CH_3O$—* | *—$CH_2$—* | $CH_3$—* | 1~60 | — | $(CH_3)_3SiO$—* |
| (A-I-32) | $CH_3O$—* | *—$CH_2$—* | $CH_3$—* | 1~60 | *—$Si(CH_3)_2$—$CH_2$—* | $(CH_3)_3SiO$—* |
| (A-I-33) | $CH_3O$—* | *—$CH_2$—* | $CH_3$—* | 1~60 | *—$Si(CH_3)_2$—$(CH_2)_2$—* | $(CH_3)_3SiO$—* |
| (A-I-34) | $CH_3O$—* | *—$CH_2$—* | $CH_3$—* | 1~60 | *—$Si(CH_3)_2$—$(CH_2)_3$—* | $(CH_3)_3SiO$—* |
| (A-I-35) | $CH_3O$—* | *—$CH_2$—* | $CH_3$—* | 1~60 | *—$Si(CH_3)_2$—$(CH_2)_4$—* | $(CH_3)_3SiO$—* |
| (A-I-36) | $CH_3O$—* | *—$(CH_2)_2$—* | $CH_3$—* | 1~60 | — | $(CH_3)_3SiO$—* |
| (A-I-37) | $CH_3O$—* | *—$(CH_2)_2$—* | $CH_3$—* | 1~60 | *—$Si(CH_3)_2$—$CH_2$—* | $(CH_3)_3SiO$—* |
| (A-I-38) | $CH_3O$—* | *—$(CH_2)_2$—* | $CH_3$—* | 1~60 | *—$Si(CH_3)_2$—$(CH_2)_2$—* | $(CH_3)_3SiO$—* |
| (A-I-39) | $CH_3O$—* | *—$(CH_2)_2$—* | $CH_3$—* | 1~60 | *—$Si(CH_3)_2$—$(CH_2)_3$—* | $(CH_3)_3SiO$—* |
| (A-I-40) | $CH_3O$—* | *—$(CH_2)_2$—* | $CH_3$—* | 1~60 | *—$Si(CH_3)_2$—$(CH_2)_4$—* | $(CH_3)_3SiO$—* |
| (A-I-41) | $CH_3O$—* | *—$(CH_2)_3$—* | $CH_3$—* | 1~60 | — | $(CH_3)_3SiO$—* |
| (A-I-42) | $CH_3O$—* | *—$(CH_2)_3$—* | $CH_3$—* | 1~60 | *—$Si(CH_3)_2$—$CH_2$—* | $(CH_3)_3SiO$—* |
| (A-I-43) | $CH_3O$—* | *—$(CH_2)_3$—* | $CH_3$—* | 1~60 | *—$Si(CH_3)_2$—$(CH_2)_2$—* | $(CH_3)_3SiO$—* |
| (A-I-44) | $CH_3O$—* | *—$(CH_2)_3$—* | $CH_3$—* | 1~60 | *—$Si(CH_3)_2$—$(CH_2)_3$—* | $(CH_3)_3SiO$—* |
| (A-I-45) | $CH_3O$—* | *—$(CH_2)_3$—* | $CH_3$—* | 1~60 | *—$Si(CH_3)_2$—$(CH_2)_4$—* | $(CH_3)_3SiO$—* |
| (A-I-46) | $CH_3O$—* | *—$(CH_2)_4$—* | $CH_3$—* | 1~60 | — | $(CH_3)_3SiO$—* |
| (A-I-47) | $CH_3O$—* | *—$(CH_2)_4$—* | $CH_3$—* | 1~60 | *—$Si(CH_3)_2$—$CH_2$—* | $(CH_3)_3SiO$—* |
| (A-I-48) | $CH_3O$—* | *—$(CH_2)_4$—* | $CH_3$—* | 1~60 | *—$Si(CH_3)_2$—$(CH_2)_2$—* | $(CH_3)_3SiO$—* |
| (A-I-49) | $CH_3O$—* | *—$(CH_2)_4$—* | $CH_3$—* | 1~60 | *—$Si(CH_3)_2$—$(CH_2)_3$—* | $(CH_3)_3SiO$—* |
| (A-I-50) | $CH_3O$—* | *—$(CH_2)_4$—* | $CH_3$—* | 1~60 | *—$Si(CH_3)_2$—$(CH_2)_4$—* | $(CH_3)_3SiO$—* |

TABLE 4-1

|  | $A^{a10}$ | $Z^{s10}$ | $R^{s20}$ | n10 | $Y^{s10}$ | $R^{s10}$ |
|---|---|---|---|---|---|---|
| (A-I-51) | $C_2H_5O$—* | *—O—* | $CH_3$—* | 1~60 | — | $CH_3$—* |
| (A-I-52) | $C_2H_5O$—* | *—O—* | $CH_3$—* | 1~60 | *—$Si(CH_3)_2$—$CH_2$—* | $CH_3$—* |
| (A-I-53) | $C_2H_5O$—* | *—O—* | $CH_3$—* | 1~60 | *—$Si(CH_3)_2$—$(CH_2)_2$—* | $CH_3$—* |
| (A-I-54) | $C_2H_5O$—* | *—O—* | $CH_3$—* | 1~60 | *—$Si(CH_3)_2$—$(CH_2)_3$—* | $CH_3$—* |
| (A-I-55) | $C_2H_5O$—* | *—O—* | $CH_3$—* | 1~60 | *—$Si(CH_3)_2$—$(CH_2)_4$—* | $CH_3$—* |
| (A-I-56) | $C_2H_5O$—* | *—$CH_2$—* | $CH_3$—* | 1~60 | — | $CH_3$—* |
| (A-I-57) | $C_2H_5O$—* | *—$CH_2$—* | $CH_3$—* | 1~60 | *—$Si(CH_3)_2$—$CH_2$—* | $CH_3$—* |
| (A-I-58) | $C_2H_5O$—* | *—$CH_2$—* | $CH_3$—* | 1~60 | *—$Si(CH_3)_2$—$(CH_2)_2$—* | $CH_3$—* |
| (A-I-59) | $C_2H_5O$—* | *—$CH_2$—* | $CH_3$—* | 1~60 | *—$Si(CH_3)_2$—$(CH_2)_3$—* | $CH_3$—* |
| (A-I-60) | $C_2H_5O$—* | *—$CH_2$—* | $CH_3$—* | 1~60 | *—$Si(CH_3)_2$—$(CH_2)_4$—* | $CH_3$—* |
| (A-I-61) | $C_2H_5O$—* | *—$(CH_2)_2$—* | $CH_3$—* | 1~60 | — | $CH_3$—* |
| (A-I-62) | $C_2H_5O$—* | *—$(CH_2)_2$—* | $CH_3$—* | 1~60 | *—$Si(CH_3)_2$—$CH_2$—* | $CH_3$—* |
| (A-I-63) | $C_2H_5O$—* | *—$(CH_2)_2$—* | $CH_3$—* | 1~60 | *—$Si(CH_3)_2$—$(CH_2)_2$—* | $CH_3$—* |
| (A-I-64) | $C_2H_5O$—* | *—$(CH_2)_2$—* | $CH_3$—* | 1~60 | *—$Si(CH_3)_2$—$(CH_2)_3$—* | $CH_3$—* |
| (A-I-65) | $C_2H_5O$—* | *—$(CH_2)_2$—* | $CH_3$—* | 1~60 | *—$Si(CH_3)_2$—$(CH_2)_4$—* | $CH_3$—* |
| (A-I-66) | $C_2H_5O$—* | *—$(CH_2)_3$—* | $CH_3$—* | 1~60 | — | $CH_3$—* |
| (A-I-67) | $C_2H_5O$—* | *—$(CH_2)_3$—* | $CH_3$—* | 1~60 | *—$Si(CH_3)_2$—$CH_2$—* | $CH_3$—* |
| (A-I-68) | $C_2H_5O$—* | *—$(CH_2)_3$—* | $CH_3$—* | 1~60 | *—$Si(CH_3)_2$—$(CH_2)_2$—* | $CH_3$—* |
| (A-I-69) | $C_2H_5O$—* | *—$(CH_2)_3$—* | $CH_3$—* | 1~60 | *—$Si(CH_3)_2$—$(CH_2)_3$—* | $CH_3$—* |
| (A-I-70) | $C_2H_5O$—* | *—$(CH_2)_3$—* | $CH_3$—* | 1~60 | *—$Si(CH_3)_2$—$(CH_2)_4$—* | $CH_3$—* |
| (A-I-71) | $C_2H_5O$—* | *—$(CH_2)_4$—* | $CH_3$—* | 1~60 | — | $CH_3$—* |
| (A-I-72) | $C_2H_5O$—* | *—$(CH_2)_4$—* | $CH_3$—* | 1~60 | *—$Si(CH_3)_2$—$CH_2$—* | $CH_3$—* |
| (A-I-73) | $C_2H_5O$—* | *—$(CH_2)_4$—* | $CH_3$—* | 1~60 | *—$Si(CH_3)_2$—$(CH_2)_2$—* | $CH_3$—* |
| (A-I-74) | $C_2H_5O$—* | *—$(CH_2)_4$—* | $CH_3$—* | 1~60 | *—$Si(CH_3)_2$—$(CH_2)_3$—* | $CH_3$—* |
| (A-I-75) | $C_2H_5O$—* | *—$(CH_2)_4$—* | $CH_3$—* | 1~60 | *—$Si(CH_3)_2$—$(CH_2)_4$—* | $CH_3$—* |

TABLE 4-2

| | $A^{a10}$ | $Z^{s10}$ | $R^{s20}$ | n10 | $Y^{s10}$ | $R^{s10}$ |
|---|---|---|---|---|---|---|
| (A-I-76) | $CH_3O-$* | *$-O-$* | $CH_3-$* | 1~60 | — | $CH_3-$* |
| (A-I-77) | $CH_3O-$* | *$-O-$* | $CH_3-$* | 1~60 | *$-Si(CH_3)_2-CH_2-$* | $CH_3-$* |
| (A-I-78) | $CH_3O-$* | *$-O-$* | $CH_3-$* | 1~60 | *$-Si(CH_3)_2-(CH_2)_2-$* | $CH_3-$* |
| (A-I-79) | $CH_3O-$* | *$-O-$* | $CH_3-$* | 1~60 | *$-Si(CH_3)_2-(CH_2)_3-$* | $CH_3-$* |
| (A-I-80) | $CH_3O-$* | *$-O-$* | $CH_3-$* | 1~60 | *$-Si(CH_3)_2-(CH_2)_4-$* | $CH_3-$* |
| (A-I-81) | $CH_3O-$* | *$-CH_2-$* | $CH_3-$* | 1~60 | — | $CH_3-$* |
| (A-I-82) | $CH_3O-$* | *$-CH_2-$* | $CH_3-$* | 1~60 | *$-Si(CH_3)_2-CH_2-$* | $CH_3-$* |
| (A-I-83) | $CH_3O-$* | *$-CH_2-$* | $CH_3-$* | 1~60 | *$-Si(CH_3)_2-(CH_2)_2-$* | $CH_3-$* |
| (A-I-84) | $CH_3O-$* | *$-CH_2-$* | $CH_3-$* | 1~60 | *$-Si(CH_3)_2-(CH_2)_3-$* | $CH_3-$* |
| (A-I-85) | $CH_3O-$* | *$-CH_2-$* | $CH_3-$* | 1~60 | *$-Si(CH_3)_2-(CH_2)_4-$* | $CH_3-$* |
| (A-I-86) | $CH_3O-$* | *$-(CH_2)_2-$* | $CH_3-$* | 1~60 | — | $CH_3-$* |
| (A-I-87) | $CH_3O-$* | *$-(CH_2)_2-$* | $CH_3-$* | 1~60 | *$-Si(CH_3)_2-CH_2-$* | $CH_3-$* |
| (A-I-88) | $CH_3O-$* | *$-(CH_2)_2-$* | $CH_3-$* | 1~60 | *$-Si(CH_3)_2-(CH_2)_2-$* | $CH_3-$* |
| (A-I-89) | $CH_3O-$* | *$-(CH_2)_2-$* | $CH_3-$* | 1~60 | *$-Si(CH_3)_2-(CH_2)_3-$* | $CH_3-$* |
| (A-I-90) | $CH_3O-$* | *$-(CH_2)_2-$* | $CH_3-$* | 1~60 | *$-Si(CH_3)_2-(CH_2)_4-$* | $CH_3-$* |
| (A-I-91) | $CH_3O-$* | *$-(CH_2)_3-$* | $CH_3-$* | 1~60 | — | $CH_3-$* |
| (A-I-92) | $CH_3O-$* | *$-(CH_2)_3-$* | $CH_3-$* | 1~60 | *$-Si(CH_3)_2-CH_2-$* | $CH_3-$* |
| (A-I-93) | $CH_3O-$* | *$-(CH_2)_3-$* | $CH_3-$* | 1~60 | *$-Si(CH_3)_2-(CH_2)_2-$* | $CH_3-$* |
| (A-I-94) | $CH_3O-$* | *$-(CH_2)_3-$* | $CH_3-$* | 1~60 | *$-Si(CH_3)_2-(CH_2)_3-$* | $CH_3-$* |
| (A-I-95) | $CH_3O-$* | *$-(CH_2)_3-$* | $CH_3-$* | 1~60 | *$-Si(CH_3)_2-(CH_2)_4-$* | $CH_3-$* |
| (A-I-96) | $CH_3O-$* | *$-(CH_2)_4-$* | $CH_3-$* | 1~60 | — | $CH_3-$* |
| (A-I-97) | $CH_3O-$* | *$-(CH_2)_4-$* | $CH_3-$* | 1~60 | *$-Si(CH_3)_2-CH_2-$* | $CH_3-$* |
| (A-I-98) | $CH_3O-$* | *$-(CH_2)_4-$* | $CH_3-$* | 1~60 | *$-Si(CH_3)_2-(CH_2)_2-$* | $CH_3-$* |
| (A-I-99) | $CH_3O-$* | *$-(CH_2)_4-$* | $CH_3-$* | 1~60 | *$-Si(CH_3)_2-(CH_2)_3-$* | $CH_3-$* |
| (A-I-100) | $CH_3O-$* | *$-(CH_2)_4-$* | $CH_3-$* | 1~60 | *$-Si(CH_3)_2-(CH_2)_4-$* | $CH_3-$* |

In (A-I-1) to (A-I-100), n10 is more preferably an integer of 2 or more, and further preferably an integer of 3 or more, and is preferably an integer of 50 or less, more preferably an integer of 40 or less, much further preferably an integer of 30 or less, and most preferably an integer of 25 or less.

Among formulas (A-I), an organosilicon compound represented by (A-I-26) is more preferable. That is, as the organosilicon compound (A) represented by formula (a2), an organosilicon compound represented by the following formula (a3) is preferable.

[Formula 22]

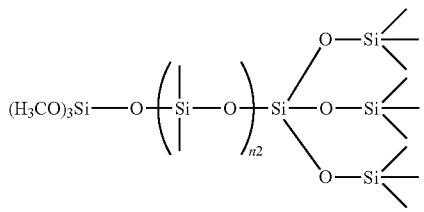

(a3)

In formula (a3), n2 is an integer of 1 to 60.

More preferably, n2 is an integer of 2 or more, and further preferably an integer of 3 or more, and is more preferably an integer of 50 or less, further preferably an integer of 40 or less, particularly preferably an integer of 30 or less, and most preferably an integer of 25 or less.

The amount of the organosilicon compound (A) is, based on the whole composition of 100% by mass, preferably 0.01% by mass or more, more preferably 0.015% by mass or more, and further preferably 0.02% by mass or more, and is preferably 0.5% by mass or less, more preferably 0.4% by mass or less, and further preferably 0.3% by mass or less.

The amount of the above-mentioned organosilicon compound (A) can be adjusted at the time of preparation of the composition. The amount of the organosilicon compound (A) may be calculated from an analysis result of the composition. It is noted that in the present specification, when referring to the ranges of the amount, mass ratio, or molar ratio of each component, as described above, those ranges can be adjusted at the time of preparation of the composition.

Examples of the method for synthesizing the organosilicon compound (A) include the methods described in Japanese Patent Laid-Open No. 2017-201009.

2. Silicon Compound (B)

The silicon compound (B) is one or more silicon compounds selected from the group consisting of a silicon compound (b) represented by the following formula (b) and a condensate (bb) thereof.

The silicon compound (b) is represented by the following formula (b).

$$Si(X)_p(OR^b)_{4-p} \qquad (b)$$

In formula (b), X is an alkyl group having 1 to 6 carbon atoms or a hydrogen atom, $R^b$ is an alkyl group having 1 to 6 carbon atoms, and p is an integer of 0 to 3.

X is preferably an alkyl group having 1 to 4 carbon atoms or a hydrogen atom, and more preferably a methyl group, an ethyl group, or a hydrogen atom. Most preferably, it is a methyl group or a hydrogen atom. $R^b$ is preferably an alkyl group having 1 to 4 carbon atoms, and more preferably a methyl group or an ethyl group. p is preferably 2 or less, more preferably 1 or less, and even more preferably 0.

The condensate (bb) is a compound obtained by condensing two or more silicon compounds (b). The average number of condensations is preferably 3 or more, and preferably 4 or more, and is preferably 70 or less, more preferably 60 or less, further preferably 50 or less, and still further preferably 30 or less.

As the condensate (bb), two or more compounds having different compositions may be used.

As the silicon compound (B), from the viewpoint of easily obtaining a coating film having excellent wear resistance and liquid repellency, it is preferable to use a condensate (bb) of the silicon compound (b). When the condensate (bb) is used as the silicon compound (B), the silicon compound (b) may be mixed.

The amount of the silicon compound (B) (the total amount in the case of a plurality of types) is, based on the whole composition of 100% by mass, preferably 0.03% by mass or more, and more preferably 0.05% by mass or more, and is preferably 0.7% by mass or less, more preferably 0.5% by mass or less, and further preferably 0.3% by mass or less.

The total amount of the organosilicon compound (A) and the silicon compound (B) is, based on the whole composition of 100% by mass, 0.05% by mass or more, and more preferably 0.07% by mass or more, and is preferably 1.0% by mass or less, and more preferably 0.7% by mass or less.

The mass ratio (silicon compound (B)/organosilicon compound (A)) of the silicon compound (B) to the organosilicon compound (A) is, for example, 1.5 or more, more preferably 2 or more, and further preferably 3 or more, and is preferably 10 or less, more preferably 8 or less, and further preferably 7 or less.

The mixed composition of the present invention is a composition in which the organosilicon compound (A) and the silicon compound (B) are mixed, and is obtained by mixing these (A) and (B) (the same applies for a mixed composition in which components other than (A) and (B) are mixed). The mixed composition of the present invention also includes compositions in which, after mixing, for example, a reaction has proceeded during storage.

The mixed composition of the present invention is a mixture of the organosilicon compound (A) and the silicon compound (B), and the mixed composition may include the silicon compound (b). In addition, the mixed composition of the present invention usually includes a compound (BB) formed by condensing two or more of the silicon compounds (B).

The mixed composition of the present invention preferably includes a co-condensate of the organosilicon compound (A) and the silicon compound (B). The presence of the co-condensate can be confirmed using various mass spectrometry methods (for example, MALDI/TOFMS method) and NMR measurement. The presence of the co-condensate is considered to impart a positive influence on improving wear resistance because when the composition of the present invention is formed into a film and a wear resistance test is carried out, the organosilicon compound (A) can be more firmly bonded to the coating film. More specifically, a peak area ratio of total alkoxy groups to a peak area of a dimethylsiloxane group in NMR measurement is preferably 0.010 or more and less than 1.600, and more preferably 0.020 or more and less than 1.000.

In the chromatogram obtained by GPC chromatography of the mixed composition of the present invention, the weight average molecular weight Mw of the compounds derived from at least one of the organosilicon compound (A) and the silicon compound (B) in terms of standard polystyrene is 2000 to 12000. By setting the Mw in this range, excellent wear resistance can be realized. The Mw is preferably 2300 or more, more preferably 2500 or more, and further preferably 3000 or more, and is preferably 10000 or less, more preferably 9300 or less, and further preferably 5500 or less. Such a Mw can be obtained by appropriately adjusting the types and amounts of the organosilicon compound (A) and the silicon compound (B) to be used and the other components, the stirring temperature and the stirring time after mixing, and the like.

The mixed composition of the present invention preferably includes a compound ($B_z1$) represented by the following formula ($b_z$).

The compound ($B_z1$) represented by the following formula ($b_z$) may be the condensate (bb), or may be a compound (BB) formed by further condensing two or more of the silicon compounds (B).

[Formula 23]

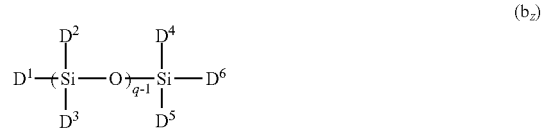

($b_z$)

In formula ($b_z$), $D^1$ and $D^4$ to $D^6$ are each independently an alkyl group having 1 to 6 carbon atoms, a hydrogen atom, a hydroxy group, or an alkoxy group having 1 to 6 carbon atoms, and $D^2$ and $D^3$ are each independently an alkyl group having 1 to 6 carbon atoms, a hydrogen atom, a hydroxy group, an alkoxy group having 1 to 6 carbon atoms, or —O—, when $D^2$ or $D^3$ is —O—, the compound ($B_z1$) is bonded to a compound ($B_z2$), which is represented by formula ($b_z$) and which is different from ($B_z1$), and the $D^2$ or $D^3$ that is —O— in the compound ($B_z1$) is directly bonded to Si of ($B_z2$) instead of any of $D^1$ to $D^6$ of ($B_z2$), and q is an average number of repetitions.

$D^1$ and $D^4$ to $D^6$ are preferably each independently an alkyl group having 1 to 4 carbon atoms (particularly an alkyl group having 1 to 2 carbon atoms), a hydroxy group, a hydrogen atom, or an alkoxy group having 1 to 4 carbon atoms, more preferably a methyl group, a hydroxy group, a hydrogen atom, or an alkoxy group having 1 to 4 carbon atoms, and further preferably a hydroxy group, a hydrogen atom or an alkoxy group having 1 to 2 carbon atoms (particularly an ethoxy group). $D^2$ and $D^3$ are preferably each independently an alkyl group having 1 to 4 carbon atoms (particularly an alkyl group having 1 to 2 carbon atoms), a hydroxy group, a hydrogen atom, an alkoxy group having 1 to 4 carbon atoms, or —O—, more preferably a methyl group, a hydroxy group, a hydrogen atom, an alkoxy group having 1 to 4 carbon atoms, or —O—, and further preferably a hydroxy group, a hydrogen atom, an alkoxy group having 1 to 2 carbon atoms (particularly an ethoxy group), or —O—. q is an average number of repetitions, and is a value determined according to the molecular weight of the compound represented by formula ($b_z$).

q is preferably 2 to 145, more preferably 4 to 100, further preferably 5 to 75, still further preferably 10 to 70, and particularly preferably 12 to 70.

An area ratio of components having a molecular weight of 5500 or more to the area of the component derived from at least one of the organosilicon compound (A) and the silicon compound (B) in GPC chromatograph measurement of the composition of the present invention is preferably 75% or less. By setting to such a ratio, the wear resistance can be further improved. The area ratio of the components having a molecular weight of 5500 or more is more preferably 65% or less, further preferably 50% or less, and much further preferably 40% or less, and is preferably 5% or more, more preferably 15% or more, and further preferably 25% or more.

In addition to the organosilicon compound (A) and the silicon compound (B), it is preferable that at least one of a catalyst (C), water (D), and a solvent (E) is mixed in the mixed composition of the present invention.

3. Catalyst (C)

The catalyst (C) is preferably a catalyst that acts as a hydrolysis/condensation catalyst of the hydrolyzable group in the organosilicon compound (A) and the hydrolyzable group in the silicon compound (B) when the silicon compound (B) has a hydrolyzable group.

The catalyst (C) may be any of an acid catalyst, a base catalyst, and an organometallic catalyst. Examples of the acid catalyst include inorganic acids such as hydrochloric acid, nitric acid, sulfuric acid, and phosphoric acid; and organic acids such as citric acid, oxalic acid, and acetic acid. Examples of the base catalyst include ammonia and amines. Examples of the organometallic catalyst include organometallic compounds having a metal element such as Al, Fe, Zn, Sn, and Zr as a central metal, and organoaluminum compounds such as aluminum acetylacetone complexes and aluminum ethyl acetoacetate complexes; organoiron compounds such as iron octylate; organozinc compounds such as zinc acetylacetonate monohydrate, zinc naphthenate, and zinc octylate; organotin compounds such as dibutyltin diacetate complex; and the like. The catalyst is preferably an acid catalyst, and particularly preferably an organic acid catalyst such as acetic acid. In particular, an acid having a pKa (acid dissociation constant) at the time of the first dissociation of 1 or more is preferable, so that the reaction when forming the coating film can be made to proceed in a moderate manner, and a good coating film can be formed. The pKa at the time of the first dissociation when the catalyst (C) is an acid catalyst is preferably 1.5 or more, more preferably 2.5 or more, and further preferably 3.5 or more, and the pKa is preferably 10 or less, more preferably 8 or less, and further preferably 6 or less.

Specific examples of the acid having a pKa at the time of the first dissociation of 1 or more include maleic acid (pKa=1.92), phosphoric acid (pKa=2.12), malonic acid (pKa=2.60), formic acid (pKa=3.75), benzoic acid (pKa=4.2), phenylethanoic acid (pKa=4.31), acetic acid (pKa=4.76), butanoic acid (pKa=4.83), 2-methylpropanoic acid (pKa=4.84), propanoic acid (pKa=4.87), and 2,2-dimethylpropanoic acid (pKa=5.03).

The amount [catalyst (C)/{organosilicon compound (A)+silicon compound (B)}] of the catalyst (C) to 100% by mass as the total amount of the organosilicon compound (A) and the silicon compound (B) is preferably 0.05% by mass or more, more preferably 0.1% by mass or more, and further preferably 1% by mass or more, and is preferably 20% by mass or less, more preferably 18% by mass or less, and further preferably 13% by mass or less.

4. Water (D)

The amount of the water (D) is, based on the whole composition of the present invention of 100% by mass, preferably 2% by mass or less. Setting to such an amount has the advantage that the reaction when forming the coating film can be made to proceed in a moderate manner, and a good coating film can be formed. The amount of the water (D) is preferably 1.5% by mass or less, and more preferably 1.0% by mass or less, and is preferably 0.005% by mass or more, more preferably 0.01s by mass or more, and further preferably 0.015% by mass or more.

The amount of the water (D) (water (D)/{organosilicon compound (A)+silicon compound (B)}) is, to 100% by mass as the total of the organosilicon compound (A) and the silicon compound (B), preferably 40% by mass or more, more preferably 60% by mass or more, and further preferably 90% by mass or more, and is preferably 300% by mass or less, and more preferably 250% by mass or less.

5. Solvent (E)

The solvent (E) means a solvent other than water, and examples thereof include alcohol solvents, ether solvents, ketone solvents, ester solvents, amide solvents, and the like.

Examples of the alcohol solvent include methanol, ethanol, propanol, 2-propanol (isopropyl alcohol), butanol, ethylene glycol, propylene glycol, diethylene glycol, and the like.

Examples of the ether solvent include dimethoxyethane, tetrahydrofuran, dioxane, and the like.

Examples of the ketone solvent include acetone, methyl ethyl ketone (2-butanone), and the like.

Examples of the ester solvent include ethyl acetate, butyl acetate, and the like.

Examples of the amide solvent include dimethylformamide and the like. Among these, an alcohol solvent or an ether solvent is preferable, and an alcohol solvent is more preferable.

The amount of the solvent (E) is, to 100% by mass of the whole composition, preferably 10% by mass or more, more preferably 50% by mass or more, further preferably 90% by mass or more, and particularly preferably 95% by mass or more, and is preferably 99.95% by mass or less, more preferably 99.90% by mass or less, and further preferably 99.80% by mass or less.

The composition of the present invention may coexist with, within a range that does not harm the effect of the present invention, for example, various additives such as an antioxidant, a rust preventive, an ultraviolet absorber, a light stabilizer, a fungicide, an antibacterial agent, a biofouling inhibitor, a deodorant, a pigment, a flame retardant, and an antistatic agent.

The mixing order of the components when preparing the mixed composition of the present invention is not particularly limited. After all the components have been added, it is preferable to stir at about 40 to 80° C. for 1 to 6 hours. A film is obtained by curing the stirred composition. The cured film serves as a liquid-repellent layer that has excellent liquid-repellency and wear resistance. It is preferable to employ the above-described stirring conditions because this promotes adjustment to the above-described molecular weight as well as promoting the formation of a copolymer of the organosilicon compound (A) and the silicon compound (B) in a preferred embodiment, and improves the wear resistance of the film obtained from the composition of the present invention.

The film obtained by curing the composition of the present invention may be formed on a substrate.

Examples of the method of bringing the composition of the present invention (hereinafter, sometimes referred to as "composition for forming a liquid-repellent layer") into contact with the base material include a method of coating the composition onto the base material. Specifically, a spin coating method, a dip coating method, a spray coating method, a roll coating method, a bar coating method, applying by hand (method in which a liquid is impregnated into a cloth and applied onto the base material), pouring (method in which a liquid is applied as is onto the base material using a dropper or the like), a spraying method (method in which a spray is used to apply onto the base material), and the like. In particular, from the viewpoint of workability, a spin coating method, a spray coating method, applying by hand, pouring, and spraying are preferable.

The coating film can be formed on the base material by, in a state in which the composition for forming a liquid-repellent layer of the present invention is in contact with the base material, leaving the composition to stand in air at normal temperature (for example, 10 minutes to 48 hours), or heating (for example, at 80 to 300° C.) the composition for about 1 to 10 hours, to promote hydrolysis of the hydrolyzable group and polycondensation.

The film thickness of the coating film (liquid-repellent layer) can be, for example, about 0.5 to 100 nm.

The base material that the composition for forming a liquid-repellent layer of the present invention is brought into contact with is not particularly limited, and the shape of the base material may be a flat surface, a curved surface, or a three-dimensional structure in which a number of surfaces are combined.

The material of the base material is also not limited, and may be composed of either an organic material or an inorganic material. Examples of organic materials include thermoplastic resins such as acrylic resin, polycarbonate resin, polyester resin, styrene resin, acrylic-styrene copolymer resin, cellulose resin, and polyolefin resin; thermosetting resins such as phenol resin, urea resin, melamine resin, epoxy resin, unsaturated polyester, silicone resin, and urethane resin; and the like. Examples of inorganic materials include ceramics; glass; metals such as iron, silicon, copper, zinc, and aluminum; alloys that include the above metals; and the like.

The base material may be subjected to an easy-adhesion treatment in advance. Examples of the easy-adhesion treatment include hydrophilic treatments such as a corona treatment, a plasma treatment, and an ultraviolet treatment. Further, the base material may also be subjected to a primer treatment with a resin, a silane coupling agent, tetraalkoxysilane, or the like, or a glass coating film of polysilazane or the like may be applied to the base material in advance.

It is preferable to further form an intermediate layer between the liquid-repellent layer obtained from the composition for forming a liquid-repellent layer of the present invention and the base material. That is, it is preferable to form on the base material an intermediate layer obtained from a composition for forming an intermediate layer, and to then form on the surface of this intermediate layer (the surface opposite to the base material) the liquid-repellent layer obtained from the composition for forming a liquid-repellent layer.

Examples of the composition for forming an intermediate layer include a mixed composition containing the polysilazane (F) and the metal compound (G) represented by the following formula (g1) and/or the compound (H) including a siloxane chain. By forming an intermediate layer obtained from such a composition for forming an intermediate layer between the liquid-repellent layer and the base material, compared with a case where only the liquid-repellent layer is formed on the base material, the formation reaction of the liquid-repellent layer is promoted, the crosslinking density of liquid-repellent layer is increased, and the wear resistance of liquid-repellent layer is significantly improved. In addition, conventionally, heating was required when forming the liquid-repellent layer at a practical speed, but by forming an intermediate layer between the liquid-repellent layer and the base material, room temperature curing of liquid-repellent layer at a practical speed is easy.

In formula (g1), M represents Al, Fe, In, Ge, Hf, Si, Ti, Sn, Zr, or Ta. $R^{g10}$ represents a hydrocarbon chain-containing group or a hydrogen atom, and r is 0 or 1. A plurality of $A^{g1}$ each independently represent a hydrolyzable group, and m, which is the valence of the metal atom M, denotes an integer selected from 3 to 5.

A preferable composition for forming an intermediate layer is now described.

6. Polysilazane (F)

The polysilazane (F) is not particularly limited as long as it is a compound having a silicon-nitrogen bond. However, the polysilazane (F) preferably has a structural unit represented by the following formula (f1).

[Formula 24]

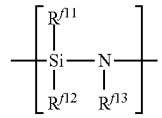

(f1)

In formula (f1), $R^{f11}$, $R^{f12}$, and $R^{f13}$ each independently represent a hydrogen atom, an optionally-substituted hydrocarbon group having 1 to 10 carbon atoms, or an alkylsilyl group.

Examples of the hydrocarbon group having 1 to 10 carbon atoms represented by $R^{f11}$ to $R^{f13}$ include straight saturated aliphatic hydrocarbon groups such as a methyl group, an ethyl group, a propyl group, a butyl group, a pentyl group, a hexyl group, a heptyl group, an octyl group, a nonyl group, and a decyl group; branched saturated aliphatic hydrocarbon groups such as an isopropyl group, a sec-butyl group, a tert-butyl group, a methylpentyl group, an ethylpentyl group, a methylhexyl group, an ethylhexyl group, a propyl hexyl group, and a tert-octyl group; cyclic saturated aliphatic hydrocarbon groups such as a cyclopentyl group, a cyclohexyl group, a cycloheptyl group, and a cyclo-octyl group; unsaturated aliphatic hydrocarbon groups such as a vinyl group, a 1-propenyl group, a 2-propenyl group, a 1-butenyl group, a 2-butenyl group, and a 3-butenyl group; aromatic hydrocarbon groups such as a phenyl group, a naphthyl group, a p-tert-butylphenyl group, a tolyl group, a xylyl group, a cumenyl group, a mesityl group, a 2,6-diethylphenyl group, and a 2-methyl-6-ethylphenyl group; and groups combining of the hydrocarbon groups mentioned here, such as an alkylcycloalkyl group, a cycloalkylalkyl group, and an aralkyl group.

Examples of the substituent that the hydrocarbon group having 1 to 10 carbon atoms optionally has include: a halogen atom selected from a fluorine atom, a chlorine atom, a bromine atom, and an iodine atom; a hydroxy group; a nitro group; an amino group; a cyano group; a thiol group; an epoxy group; a glycidoxy group; a (meth)acroyloxy group; a heteroaryl group having 6 to 12 atoms forming a ring; an alkoxy group having 1 to 3 carbon atoms, such as a methoxy group and an ethoxy group; an aryloxy group having 6 to 12 carbon atoms forming a ring; and the like.

The hydrocarbon group having 1 to 10 carbon atoms represented by $R^{f11}$ to $R^{f13}$ is preferably an unsubstituted saturated aliphatic hydrocarbon group having 1 to 10 carbon atoms, more preferably an unsubstituted saturated aliphatic hydrocarbon group having 1 to 6 carbon atoms, and further preferably an unsubstituted methyl group, ethyl group, propyl group, or butyl group, and most preferably a methyl group.

Examples of the alkylsilyl group represented by $R^{f11}$ to $R^{f13}$ include a trimethylsilyl group, a triethylsilyl group, a tri-n-propylsilyl group, a tri-isopropylsilyl group, a tri-t-butylsilyl group, a methyldiethylsilyl group, a dimethylsilyl group, a diethylsilyl group, a methylsilyl group, an ethylsilyl group, and the like.

The polysilazane (F) is preferably a polysilazane having a structural unit (f2) in which at least one of $R^{f11}$ and $R^{f12}$ in formula (f1) is a hydrocarbon group having 1 to 10 carbon atoms, that is, is preferably an organic polysilazane. Further, $R^{f13}$ is preferably a hydrogen atom.

It is more preferable that, in addition to the structural unit (f2), the polysilazane (F) additionally has a structural unit represented by the following formula (f3).

[Formula 25]

(f3)

In formula (f3), $R^{f31}$ and $R^{f32}$ each independently represent a hydrogen atom or a hydrocarbon group having 1 to 10 carbon atoms, $Y^f$ represents a divalent hydrocarbon group having 1 to 10 carbon atoms, and a plurality of $X^f$ each independently represent a hydrolyzable group.

Examples of the hydrocarbon group having 1 to 10 carbon atoms represented by $R^{f31}$ and $R^{f32}$ include the same groups as those described for the hydrocarbon group having 1 to 10 carbon atoms represented by $R^{f11}$ to $R^{f13}$. Among them, a saturated aliphatic hydrocarbon group having 1 to 10 carbon atoms is preferable, more preferable is a straight saturated aliphatic hydrocarbon group having 1 to 6 carbon atoms, and further preferable is a methyl group, an ethyl group, a propyl group, or a butyl group.

The number of carbon atoms of the divalent hydrocarbon group represented by $Y^f$ is preferably 1 to 4, more preferably 1 to 3, and further preferably 1 to 2. The divalent hydrocarbon group is preferably in the form of a chain, and when it is in the form of a chain, the divalent hydrocarbon group may be in the form of straight or branched chain. The divalent hydrocarbon group is preferably a divalent aliphatic hydrocarbon group, and preferably an alkanediyl group. Examples of the divalent hydrocarbon group include a methylene group, an ethylene group, a propylene group, a butylene group, and the like.

Further, some of the —CH$_2$— included in the divalent hydrocarbon group may be replaced by —O—. In this case, two consecutive —CH$_2$— are not replaced by —O— at the same time, and a —CH$_2$— adjacent to the Si atom is not replaced by —O—. When two or more —CH$_2$— are replaced by —O—, the number of carbon atoms between —O— and —O— is preferably 2 to 4, and more preferably 2 to 3. Specific examples of the group in which some of the divalent hydrocarbon groups are replaced by —O— include a group having a (poly)ethylene glycol unit, a group having a (poly)propylene glycol unit, and the like.

The hydrolyzable group of $X^f$ may be any group that gives a hydroxy group (silanol group) by hydrolysis. Preferable examples thereof include an alkoxy group having 1 to 4 carbon atoms, such as a methoxy group, an ethoxy group, a propoxy group, and a butoxy group; a hydroxy group; an acetoxy group; a chlorine atom; an isocyanate group; and the like. Among these, an alkoxy group having 1 to 4 carbon atoms is preferable, and an alkoxy group having 1 to 2 carbon atoms is more preferable. The plurality of $X^f$'s may be the same or different, but are preferably the same.

The content of the $SiX^f_3$ group of formula (f3) is, based on 100% by mass of the polysilazane (F), preferably 2% by mass or more, more preferably 5% by mass or more, and further preferably 8% by mass or more. The upper limit is not limited, but it may be 50% by mass or less, 40% by mass or less, or 30% by mass or less.

When the polysilazane (F) is an organic polysilazane, the content ratio of the hydrogen atom of Si—H and the hydrocarbon group having 1 to 10 carbon atoms bonded to the Si can be appropriately selected. For example, the molar ratio of the hydrocarbon group/hydrogen atom is 0.1 to 50, and preferably 0.2 to 10. The molar ratio can be calculated from NMR measurement and the like.

The amount of the polysilazane (F) is, based on the whole composition of 100% by mass, preferably 0.01% by mass or more, more preferably 0.05% by mass or more, further preferably 0.1% by mass or more, and still further preferably 0.3% by mass or more, and is preferably 2.5% by mass or less, more preferably 2% by mass or less, further preferably 1.5% by mass or less, and still further preferably 1% by mass or less.

7. Metal Compound (G)

The metal compound (G) is a metal compound represented by the following formula (g1).

$$M(R^{g10})_r(A^{g1})_{m-r} \quad (g1)$$

In formula (g1), M represents Al, Fe, In, Ge, Hf, Si, Ti, Sn, Zr, or Ta. $R^{g10}$ represents a hydrocarbon chain-containing group or a hydrogen atom, and r is 0 or 1. A plurality of $A^{g1}$ each independently represent a hydrolyzable group, and m, which is the valence of the metal atom M, denotes an integer selected from 3 to 5.

The metal compound (G) is a compound in which, as represented by formula (g1), at least a hydrolyzable group $A^{g1}$ is bonded to a metal atom M. In this specification, the meaning of "metal" includes semimetals such as Si and Ge.

The metal atom M is preferably Al, Si, Ti, Sn, or Zr, more preferably Al, Si, Ti, or Zr, and further preferably Si.

The hydrolyzable group represented by $A^{g1}$ and the hydrocarbon chain-containing group represented by $R^{g10}$ can be appropriately selected from the hydrolyzable groups and the hydrocarbon chain-containing groups described for the organosilicon compound (A), and the preferred ranges thereof are also the same.

When the metal atom M is a trivalent metal such as Al, Fe, or In, m is 3, when the metal atom M is a tetravalent metal such as Ge, Hf, Si, Ti, Sn, or Zr, m is 4, and when the metal atom M is a pentavalent metal such as Ta, m is 5.

The composition for forming an intermediate layer may use two or more types of the metal compound (G).

Examples of the metal compound (G) include: a metal compound G1 in which r=0, that is, only a hydrolyzable group $A^{g1}$ is bonded to the metal atom M; and a metal compound G2 in which r=1, that is, one hydrocarbon chain-containing group or hydrogen atom and two or more hydrolyzable groups $A^{g1}$ are bonded to the metal atom M.

(Metal Compound G1)

Specific examples of the metal compound G1 in which only a hydrolyzable group $A^{g1}$ is bonded to the metal atom M include: trialkoxyaluminum, such as triethoxyaluminum, tripropoxyaluminum, and tributoxyaluminum; trialkoxyiron, such as triethoxyiron; trialkoxyindium, such as trimethoxyindium, triethoxyindium, tripropoxyindium, and tributoxyindium; tetraalkoxygermanium, such as tetramethoxygermanium, tetraethoxygermanium, tetrapropoxygermanium, and tetrabutoxygermanium; tetraalkoxyhafnium, such as tetramethoxyhafnium, tetraethoxyhafnium, tetrapropoxyhafnium, and tetrabutoxyhafnium; tetraalkoxysilanes, such as tetramethoxysilane, tetraethoxysilane, tetrapropoxysilane, and tetrabutoxysilane; tetraalkoxytitanium, such as tetramethoxytitanium, tetraethoxytitanium, tetrapropoxytitanium, and tetrabutoxytitanium; tetraalkoxytin, such as tetramethoxytin, tetraethoxytin, tetrapropoxytin, and tetrabutoxytin; tetraalkoxyzirconium, such as tetramethoxyzirconium, tetraethoxyzirconium, tetrapropoxyzirconium, and tetrabutoxyzirconium; penta-alkoxytantalum such as pentamethoxytantalum, pentaethoxytantalum, pentapropoxytantalum, pentabutoxytantalum; and the like.

(Metal Compound G2)

The metal compound G2, in which one hydrocarbon chain-containing group or hydrogen atom and two or more hydrolyzable groups $A^{g1}$ are bonded to the metal atom M, is preferably a metal compound in which the metal atom M is a tetravalent metal (Ge, Hf, Si, Ti, Sn, Zr, etc.). Specific examples when the metal atom M is Si include: alkyltrialkoxysilanes, such as methyltrimethoxysilane, ethyltrimethoxysilane, methyltriethoxysilane, ethyltriethoxysilane, and methyltripropoxysilane; alkenyltrialkoxysilanes, such as vinyltrimethoxysilane and vinyltriethoxysilane; trialkoxysilanes, such as trimethoxysilane, triethoxysilane and tripropoxysilane; dialkoxyalkylsilanes such as dimethoxymethylsilane and diethoxymethylsilane; and the like.

Specifically, as the metal compound (G), a compound represented by the following formula (g2) is preferable.

$$Si(OR^{g21})_yH_{4-y} \quad (g2)$$

In formula (g2), $R^{g21}$ represents an alkyl group having 1 to 6 carbon atoms, and y is 3 or 4.

Examples of the alkyl group represented by $R^{g21}$ include a methyl group, an ethyl group, a propyl group, a butyl group, a pentyl group, a hexyl group, and the like. The number of carbon atoms of the alkyl group represented by $R^{g21}$ is preferably 1 to 4, more preferably 1 to 3, and further preferably 1 or 2.

When the metal compound (G) is used in the composition for forming an intermediate layer, the amount of the metal compound (G) is, for example, based on the whole composition of 100; by mass, preferably 0.01, by mass or more, more preferably 0.05% by mass or more, further preferably 0.1% by mass or more, and particularly preferably 0.15% by mass or more, and is preferably 10% by mass or less, more preferably 3% by mass or less, further preferably 1 by mass or less, and particularly preferably 0.8, by mass or less.

When the metal compound (G) is used in the composition for forming an intermediate layer, the total amount of the polysilazane (F) and the metal compound (G) is, based on the whole composition of 100% by mass, for example, preferably 0.02% by mass or more, and more preferably 0.1% by mass or more, and is preferably 10% by mass or less, more preferably 5, by mass or less, further preferably 3% by mass or less, and particularly preferably 1% by mass or less.

8. Compound (H) Including a Siloxane Chain

The compound (H) including a siloxane chain is not particularly limited as long as it is a compound having at least one siloxane bond. The siloxane chain may be straight or branched, but is preferably straight.

The siloxane chain preferably includes a dialkylsiloxane chain, and more preferably a straight dialkylsiloxane chain. Further, the siloxane chain may further contain a divalent group other than the siloxane bond. Examples of the divalent group include a divalent hydrocarbon group, a group in which some of the methylene groups (—$CH_2$—) of the divalent hydrocarbon group are replaced by oxygen atoms, —O—, and the like.

It is preferable that a silyl group is bonded to the end of the siloxane chain. A silyl group is a group in which three substituents are bonded to a silicon atom. Examples of the substituents include a hydrogen atom, a hydrocarbon chain-containing group, an alkylsilyloxy group, a group including an alkylsilyl group and a siloxane chain, a hydrolyzable group, and the like.

The hydrocarbon chain-containing group is preferably composed of only hydrocarbon groups (hydrocarbon chains). The number of carbon atoms of the hydrocarbon chain moiety means, for a non-oxygen-substituted hydrocarbon chain-containing group, the number of carbon atoms constituting the hydrocarbon group (hydrocarbon chain), and for an oxygen-substituted hydrocarbon chain-containing group, the number of carbon atoms constituting the hydrocarbon group (hydrocarbon chain) counted by assuming that the oxygen atoms are a methylene group (—$CH_2$—).

Hereinafter, unless otherwise specified, the hydrocarbon chain-containing group is described based on the example of a non-oxygen-substituted hydrocarbon chain-containing group (that is, a monovalent hydrocarbon group) as an example, but in the entire description below, it is possible to replace some of the methylene groups —$CH_2$— by oxygen atoms.

The hydrocarbon chain-containing group is composed of only hydrocarbon groups, and preferably has 1 or more and 3 or less carbon atoms, and more preferably 1 carbon atom. Further, the hydrocarbon chain-containing group is more preferably a saturated aliphatic hydrocarbon chain-containing group. As the saturated aliphatic hydrocarbon chain-containing group, a saturated aliphatic hydrocarbon group (alkyl group) is more preferable. Examples of the saturated aliphatic hydrocarbon group include a methyl group, an ethyl group, a propyl group, and the like.

The hydrolyzable group may be any group that gives a hydroxy group (silanol group) by hydrolysis. Preferable examples thereof include an alkoxy group having 1 to 6 carbon atoms, such as a methoxy group, an ethoxy group, a propoxy group, and a butoxy group; a hydroxy group; an acetoxy group; a chlorine atom; an isocyanate group; and the like. Among these, an alkoxy group having 1 to 6 carbon atoms is preferable, an alkoxy group having 1 to 4 carbon atoms is more preferable, and an alkoxy group having 1 or 2 carbon atoms is further preferable.

When one silicon atom of the silyl group bonded to the end of the siloxane chain has a plurality of substituents, the plurality of substituents may be the same or different.

It is preferable that at least one end of the siloxane chain is bonded to a silicon atom to which at least one hydrolyzable group is bonded, more preferably to a silicon atom to which two or more hydrolyzable groups are bonded, and further preferably to a silicon atom to which three hydrolyzable groups are bonded. The silicon atom to which the hydrolyzable group(s) is/are bonded may be bonded to both ends of the siloxane chain, but is preferably bonded only to one end.

It is more preferable that both ends of the siloxane chain are bonded to any one of a silyl group having three alkoxy groups as substituents (trialkoxysilyl group), a silyl group having three alkyl groups as substituents (trialkylsilyl group), and a silyl group having three trialkylsilyloxy groups as substituents (tris(trialkylsilyloxy)silyl group). It is particularly preferable that one end is bonded to a trialkoxysilyl group and the other end is bonded to a trialkylsilyl group or to a tris(trialkylsilyloxy)silyl group.

A more preferable mode of the compound (H) including a siloxane chain is a compound in which a molecular chain having a trialkylsilyl group and a siloxane chain (hereinafter, this molecular chain is sometimes referred to as "molecular chain (ts1)") is bonded to at least one silicon atom (hereinafter, this silicon atom is sometimes referred to as "central silicon atom").

In the compound (H) including a siloxane chain, the number of molecular chains (ts1) bonded to the central silicon atom is 1 or more, and is preferably 3 or less, more preferably 2 or less, and particularly preferably 1.

The central silicon atom of the compound (H) including a siloxane chain may be bonded to, in addition to the molecular chain (ts1), a hydrolyzable group, a siloxane skeleton-containing group having fewer atoms than the number of atoms constituting the molecular chain (ts1), or a hydrocarbon chain-containing group containing a hydrocarbon chain having fewer carbon atoms than the number of atoms constituting the molecular chain (ts1).

Specifically, the compound (H) including a siloxane chain is preferably a compound represented by the following formula (h1).

[Formula 26]

(h1)

In formula (h1), $R^{h1}$, represents a molecular chain having a trialkylsilyl group and a siloxane chain, each $A^{h1}$ independently represents a hydrolyzable group, $Z^{h1}$ represents a molecular chain having a trialkylsilyl group and a siloxane chain, a siloxane skeleton-containing group, or a hydrocarbon chain-containing group, a hydrogen atom included in the trialkylsilyl groups of $R^{h1}$ and $Z^{h1}$ is optionally replaced by a fluorine atom, and x denotes an integer of 0 to 3.

The molecular chain (molecular chain (ts1)) having a trialkylsilyl group and a siloxane chain of $R^{h1}$ is a monovalent group having a structure in which the trialkylsilyl-containing group is bonded to an end of the siloxane chain.

The trialkylsilyl-containing group is a group that includes at least one trialkylsilyl group, and includes preferably two or more trialkylsilyl groups, and more preferably three trialkylsilyl groups.

Similar to the organosilicon compound (A), the trialkylsilyl-containing group is preferably a group represented by formula (s1).

In the molecular chain (ts1), the trialkylsilyl-containing group is preferably bonded to an end (free end side) of the siloxane chain, and particularly to an end (free end side) of the main chain (longest straight chain) of the siloxane chain.

The siloxane chain to which the trialkylsilyl-containing group is bonded is the same as the siloxane chain described above, and preferably includes a straight dialkylsiloxane chain. Further, the molecular chain may include a divalent hydrocarbon group. Even if a part of the molecular chain is a divalent hydrocarbon group, the rest is a dialkylsiloxane chain, and therefore the obtained coating film has good chemical and physical durability.

The siloxane chain is preferably a group represented by formula (s2) shown above for the organosilicon compound (A).

Examples of the siloxane chain contained in the molecular chain (ts1) include a siloxane chain represented by the following formula. In the formula, q1 represents an integer of 1 to 60, and * represents a bond bonding to a central silicon atom or a trialkylsilyl-containing group.

[Formula 27]

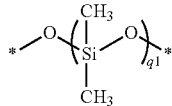

The total number of elements constituting the molecular chain (ts1) is preferably 24 or more, more preferably 40 or more, and further preferably 50 or more, and is preferably 1200 or less, more preferably 700, and further preferably 250 or less.

The molecular chain (ts1) is preferably a group represented by formula (s3) shown above for the organosilicon compound (A).

The molecular chain (ts1) is preferably a group represented by formula (s3-1) or formula (s3-2) shown above for the organosilicon compound (A), and more preferably a group represented by formula (s3-2).

Examples of the molecular chain (ts1) include the groups represented by formula (s3-I) shown above for the organosilicon compound (A).

Next, the $A^{h1}$ in formula (h1) will be described. Each $A^{h1}$ is independently a hydrolyzable group, and may be any group that gives a hydroxy group (silanol group) by hydrolysis. Preferable examples thereof include an alkoxy group having 1 to 6 carbon atoms, such as a methoxy group, an ethoxy group, a propoxy group, and a butoxy group; a hydroxy group; an acetoxy group; a chlorine atom; an isocyanate group; and the like. Among these, an alkoxy group having 1 to 6 carbon atoms is preferable, an alkoxy group having 1 to 4 carbon atoms is more preferable, and an alkoxy group having 1 to 2 carbon atoms is further preferable.

$Z^{h1}$ in formula (h1) represents a molecular chain having a trialkylsilyl group and a siloxane chain, a siloxane skeleton-containing group, or a hydrocarbon chain-containing group. When $Z^{h1}$ is a molecular chain having a trialkylsilyl group and a siloxane chain, examples of $Z^{h1}$ include the same as those described above for $R^{h1}$. Further, $Z^{h1}$ may be a siloxane skeleton-containing group having fewer atoms than the number of atoms constituting the molecular chain (ts1) represented by $R^{h1}$.

When $Z^{h1}$ is a hydrocarbon chain-containing group, it is preferable that the number of carbon atoms of the hydrocarbon chain moiety is fewer than the number of atoms constituting the molecular chain (ts1). Further, it is preferable that the number of carbon atoms of the longest straight chain of the hydrocarbon chain is fewer than the number of atoms constituting the longest straight chain of the molecular chain (ts1). Examples of the hydrocarbon chain-containing group include the same groups described above as examples of a hydrocarbon chain-containing group.

In formula (h1), x is preferably an integer of 2 or less, more preferably 0 or 1, and further preferably 0.

Specific examples of the compound (H) including a siloxane chain represented by formula (h2) include a compound represented by formula (h-I). In formula (h-I), $A^{h10}$, $Z^{h10}$, $R^{h20}$, h10, $Y^{h10}$, and $R^{h10}$ are preferably combined as shown in Tables 5-1, 5-2, 6-1 and 6-2 below.

[Formula 28]

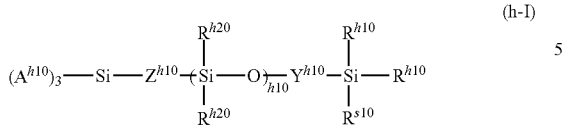

(h-I)

TABLE 5-1

| | $A^{h10}$ | $Z^{h10}$ | $R^{h20}$ | h10 | $Y^{h10}$ | $R^{h10}$ |
|---|---|---|---|---|---|---|
| (h-I-1) | $C_2H_5O$—* | *—O—* | $CH_3$—* | 1~60 | — | $(CH_3)_3SiO$—* |
| (h-I-2) | $C_2H_5O$—* | *—O—* | $CH_3$—* | 1~60 | *—$Si(CH_3)_2$—$CH_2$—* | $(CH_3)_3SiO$—* |
| (h-I-3) | $C_2H_5O$—* | *—O—* | $CH_3$—* | 1~60 | *—$Si(CH_3)_2$—$(CH_2)_2$—* | $(CH_3)_3SiO$—* |
| (h-I-4) | $C_2H_5O$—* | *—O—* | $CH_3$—* | 1~60 | *—$Si(CH_3)_2$—$(CH_2)_3$—* | $(CH_3)_3SiO$—* |
| (h-I-5) | $C_2H_5O$—* | *—O—* | $CH_3$—* | 1~60 | *—$Si(CH_3)_2$—$(CH_2)_4$—* | $(CH_3)_3SiO$—* |
| (h-I-6) | $C_2H_5O$—* | *—$CH_2$—* | $CH_3$—* | 1~60 | — | $(CH_3)_3SiO$—* |
| (h-I-7) | $C_2H_5O$—* | *—$CH_2$—* | $CH_3$—* | 1~60 | *—$Si(CH_3)_2$—$CH_2$—* | $(CH_3)_3SiO$—* |
| (h-I-8) | $C_2H_5O$—* | *—$CH_2$—* | $CH_3$—* | 1~60 | *—$Si(CH_3)_2$—$(CH_2)_2$—* | $(CH_3)_3SiO$—* |
| (h-I-9) | $C_2H_5O$—* | *—$CH_2$—* | $CH_3$—* | 1~60 | *—$Si(CH_3)_2$—$(CH_2)_3$—* | $(CH_3)_3SiO$—* |
| (h-I-10) | $C_2H_5O$—* | *—$CH_2$—* | $CH_3$—* | 1~60 | *—$Si(CH_3)_2$—$(CH_2)_4$—* | $(CH_3)_3SiO$—* |
| (h-I-11) | $C_2H_5O$—* | *—$(CH_2)_2$—* | $CH_3$—* | 1~60 | — | $(CH_3)_3SiO$—* |
| (h-I-12) | $C_2H_5O$—* | *—$(CH_2)_2$—* | $CH_3$—* | 1~60 | *—$Si(CH_3)_2$—$CH_2$—* | $(CH_3)_3SiO$—* |
| (h-I-13) | $C_2H_5O$—* | *—$(CH_2)_2$—* | $CH_3$—* | 1~60 | *—$Si(CH_3)_2$—$(CH_2)_2$—* | $(CH_3)_3SiO$—* |
| (h-I-14) | $C_2H_5O$—* | *—$(CH_2)_2$—* | $CH_3$—* | 1~60 | *—$Si(CH_3)_2$—$(CH_2)_3$—* | $(CH_3)_3SiO$—* |
| (h-I-15) | $C_2H_5O$—* | *—$(CH_2)_2$—* | $CH_3$—* | 1~60 | *—$Si(CH_3)_2$—$(CH_2)_4$—* | $(CH_3)_3SiO$—* |
| (h-I-16) | $C_2H_5O$—* | *—$(CH_2)_3$—* | $CH_3$—* | 1~60 | — | $(CH_3)_3SiO$—* |
| (h-I-17) | $C_2H_5O$—* | *—$(CH_2)_3$—* | $CH_3$—* | 1~60 | *—$Si(CH_3)_2$—$CH_2$—* | $(CH_3)_3SiO$—* |
| (h-I-18) | $C_2H_5O$—* | *—$(CH_2)_3$—* | $CH_3$—* | 1~60 | *—$Si(CH_3)_2$—$(CH_2)_2$—* | $(CH_3)_3SiO$—* |
| (h-I-19) | $C_2H_5O$—* | *—$(CH_2)_3$—* | $CH_3$—* | 1~60 | *—$Si(CH_3)_2$—$(CH_2)_3$—* | $(CH_3)_3SiO$—* |
| (h-I-20) | $C_2H_5O$—* | *—$(CH_2)_3$—* | $CH_3$—* | 1~60 | *—$Si(CH_3)_2$—$(CH_2)_4$—* | $(CH_3)_3SiO$—* |
| (h-I-21) | $C_2H_5O$—* | *—$(CH_2)_4$—* | $CH_3$—* | 1~60 | — | $(CH_3)_3SiO$—* |
| (h-I-22) | $C_2H_5O$—* | *—$(CH_2)_4$—* | $CH_3$—* | 1~60 | *—$Si(CH_3)_2$—$CH_2$—* | $(CH_3)_3SiO$—* |
| (h-I-23) | $C_2H_5O$—* | *—$(CH_2)_4$—* | $CH_3$—* | 1~60 | *—$Si(CH_3)_2$—$(CH_2)_2$—* | $(CH_3)_3SiO$—* |
| (h-I-24) | $C_2H_5O$—* | *—$(CH_2)_4$—* | $CH_3$—* | 1~60 | *—$Si(CH_3)_2$—$(CH_2)_3$—* | $(CH_3)_3SiO$—* |
| (h-I-25) | $C_2H_5O$—* | *—$(CH_2)_4$—* | $CH_3$—* | 1~60 | *—$Si(CH_3)_2$—$(CH_2)_4$—* | $(CH_3)_3SiO$—* |

TABLE 5-2

| | $A^{h10}$ | $Z^{h10}$ | $R^{h20}$ | h10 | $Y^{h10}$ | $R^{h10}$ |
|---|---|---|---|---|---|---|
| (h-I-26) | $CH_3O$—* | *—O—* | $CH_3$—* | 1~60 | — | $(CH_3)_3SiO$—* |
| (h-I-27) | $CH_3O$—* | *—O—* | $CH_3$—* | 1~60 | *—$Si(CH_3)_2$—$CH_2$—* | $(CH_3)_3SiO$—* |
| (h-I-28) | $CH_3O$—* | *—O—* | $CH_3$—* | 1~60 | *—$Si(CH_3)_2$—$(CH_2)_2$—* | $(CH_3)_3SiO$—* |
| (h-I-29) | $CH_3O$—* | *—O—* | $CH_3$—* | 1~60 | *—$Si(CH_3)_2$—$(CH_2)_3$—* | $(CH_3)_3SiO$—* |
| (h-I-30) | $CH_3O$—* | *—O—* | $CH_3$—* | 1~60 | *—$Si(CH_3)_2$—$(CH_2)_4$—* | $(CH_3)_3SiO$—* |
| (h-I-31) | $CH_3O$—* | *—$CH_2$—* | $CH_3$—* | 1~60 | — | $(CH_3)_3SiO$—* |
| (h-I-32) | $CH_3O$—* | *—$CH_2$—* | $CH_3$—* | 1~60 | *—$Si(CH_3)_2$—$CH_2$—* | $(CH_3)_3SiO$—* |
| (h-I-33) | $CH_3O$—* | *—$CH_2$—* | $CH_3$—* | 1~60 | *—$Si(CH_3)_2$—$(CH_2)_2$—* | $(CH_3)_3SiO$—* |
| (h-I-34) | $CH_3O$—* | *—$CH_2$—* | $CH_3$—* | 1~60 | *—$Si(CH_3)_2$—$(CH_2)_3$—* | $(CH_3)_3SiO$—* |
| (h-I-35) | $CH_3O$—* | *—$CH_2$—* | $CH_3$—* | 1~60 | *—$Si(CH_3)_2$—$(CH_2)_4$—* | $(CH_3)_3SiO$—* |
| (h-I-36) | $CH_3O$—* | *—$(CH_2)_2$—* | $CH_3$—* | 1~60 | — | $(CH_3)_3SiO$—* |
| (h-I-37) | $CH_3O$—* | *—$(CH_2)_2$—* | $CH_3$—* | 1~60 | *—$Si(CH_3)_2$—$CH_2$—* | $(CH_3)_3SiO$—* |
| (h-I-38) | $CH_3O$—* | *—$(CH_2)_2$—* | $CH_3$—* | 1~60 | *—$Si(CH_3)_2$—$(CH_2)_2$—* | $(CH_3)_3SiO$—* |
| (h-I-39) | $CH_3O$—* | *—$(CH_2)_2$—* | $CH_3$—* | 1~60 | *—$Si(CH_3)_2$—$(CH_2)_3$—* | $(CH_3)_3SiO$—* |
| (h-I-40) | $CH_3O$—* | *—$(CH_2)_2$—* | $CH_3$—* | 1~60 | *—$Si(CH_3)_2$—$(CH_2)_4$—* | $(CH_3)_3SiO$—* |
| (h-I-41) | $CH_3O$—* | *—$(CH_2)_3$—* | $CH_3$—* | 1~60 | — | $(CH_3)_3SiO$—* |
| (h-I-42) | $CH_3O$—* | *—$(CH_2)_3$—* | $CH_3$—* | 1~60 | *—$Si(CH_3)_2$—$CH_2$—* | $(CH_3)_3SiO$—* |
| (h-I-43) | $CH_3O$—* | *—$(CH_2)_3$—* | $CH_3$—* | 1~60 | *—$Si(CH_3)_2$—$(CH_2)_2$—* | $(CH_3)_3SiO$—* |
| (h-I-44) | $CH_3O$—* | *—$(CH_2)_3$—* | $CH_3$—* | 1~60 | *—$Si(CH_3)_2$—$(CH_2)_3$—* | $(CH_3)_3SiO$—* |
| (h-I-45) | $CH_3O$—* | *—$(CH_2)_3$—* | $CH_3$—* | 1~60 | *—$Si(CH_3)_2$—$(CH_2)_4$—* | $(CH_3)_3SiO$—* |
| (h-I-46) | $CH_3O$—* | *—$(CH_2)_4$—* | $CH_3$—* | 1~60 | — | $(CH_3)_3SiO$—* |
| (h-I-47) | $CH_3O$—* | *—$(CH_2)_4$—* | $CH_3$—* | 1~60 | *—$Si(CH_3)_2$—$CH_2$—* | $(CH_3)_3SiO$—* |
| (h-I-48) | $CH_3O$—* | *—$(CH_2)_4$—* | $CH_3$—* | 1~60 | *—$Si(CH_3)_2$—$(CH_2)_2$—* | $(CH_3)_3SiO$—* |
| (h-I-49) | $CH_3O$—* | *—$(CH_2)_4$—* | $CH_3$—* | 1~60 | *—$Si(CH_3)_2$—$(CH_2)_3$—* | $(CH_3)_3SiO$—* |
| (h-I-50) | $CH_3O$—* | *—$(CH_2)_4$—* | $CH_3$—* | 1~60 | *—$Si(CH_3)_2$—$(CH_2)_4$—* | $(CH_3)_3SiO$—* |

TABLE 6-1

| | $A^{h10}$ | $Z^{h10}$ | $R^{h20}$ | h10 | $Y^{h10}$ | $R^{h10}$ |
|---|---|---|---|---|---|---|
| (h-I-51) | $C_2H_5O$—* | *—O—* | $CH_3$—* | 1~60 | — | $CH_3$—* |
| (h-I-52) | $C_2H_5O$—* | *—O—* | $CH_3$—* | 1~60 | *—Si$(CH_3)_2$—$CH_2$—* | $CH_3$—* |
| (h-I-53) | $C_2H_5O$—* | *—O—* | $CH_3$—* | 1~60 | *—Si$(CH_3)_2$—$(CH_2)_2$—* | $CH_3$—* |
| (h-I-54) | $C_2H_5O$—* | *—O—* | $CH_3$—* | 1~60 | *—Si$(CH_3)_2$—$(CH_2)_3$—* | $CH_3$—* |
| (h-I-55) | $C_2H_5O$—* | *—O—* | $CH_3$—* | 1~60 | *—Si$(CH_3)_2$—$(CH_2)_4$—* | $CH_3$—* |
| (h-I-56) | $C_2H_5O$—* | *—$CH_2$—* | $CH_3$—* | 1~60 | — | $CH_3$—* |
| (h-I-57) | $C_2H_5O$—* | *—$CH_2$—* | $CH_3$—* | 1~60 | *—Si$(CH_3)_2$—$CH_2$—* | $CH_3$—* |
| (h-I-58) | $C_2H_5O$—* | *—$CH_2$—* | $CH_3$—* | 1~60 | *—Si$(CH_3)_2$—$(CH_2)_2$—* | $CH_3$—* |
| (h-I-59) | $C_2H_5O$—* | *—$CH_2$—* | $CH_3$—* | 1~60 | *—Si$(CH_3)_2$—$(CH_2)_3$—* | $CH_3$—* |
| (h-I-60) | $C_2H_5O$—* | *—$CH_2$—* | $CH_3$—* | 1~60 | *—Si$(CH_3)_2$—$(CH_2)_4$—* | $CH_3$—* |
| (h-I-61) | $C_2H_5O$—* | *—$(CH_2)_2$—* | $CH_3$—* | 1~60 | — | $CH_3$—* |
| (h-I-62) | $C_2H_5O$—* | *—$(CH_2)_2$—* | $CH_3$—* | 1~60 | *—Si$(CH_3)_2$—$CH_2$—* | $CH_3$—* |
| (h-I-63) | $C_2H_5O$—* | *—$(CH_2)_2$—* | $CH_3$—* | 1~60 | *—Si$(CH_3)_2$—$(CH_2)_2$—* | $CH_3$—* |
| (h-I-64) | $C_2H_5O$—* | *—$(CH_2)_2$—* | $CH_3$—* | 1~60 | *—Si$(CH_3)_2$—$(CH_2)_3$—* | $CH_3$—* |
| (h-I-65) | $C_2H_5O$—* | *—$(CH_2)_2$—* | $CH_3$—* | 1~60 | *—Si$(CH_3)_2$—$(CH_2)_4$—* | $CH_3$—* |
| (h-I-66) | $C_2H_5O$—* | *—$(CH_2)_3$—* | $CH_3$—* | 1~60 | — | $CH_3$—* |
| (h-I-67) | $C_2H_5O$—* | *—$(CH_2)_3$—* | $CH_3$—* | 1~60 | *—Si$(CH_3)_2$—$CH_2$—* | $CH_3$—* |
| (h-I-68) | $C_2H_5O$—* | *—$(CH_2)_3$—* | $CH_3$—* | 1~60 | *—Si$(CH_3)_2$—$(CH_2)_2$—* | $CH_3$—* |
| (h-I-69) | $C_2H_5O$—* | *—$(CH_2)_3$—* | $CH_3$—* | 1~60 | *—Si$(CH_3)_2$—$(CH_2)_3$—* | $CH_3$—* |
| (h-I-70) | $C_2H_5O$—* | *—$(CH_2)_3$—* | $CH_3$—* | 1~60 | *—Si$(CH_3)_2$—$(CH_2)_4$—* | $CH_3$—* |
| (h-I-71) | $C_2H_5O$—* | *—$(CH_2)_4$—* | $CH_3$—* | 1~60 | — | $CH_3$—* |
| (h-I-72) | $C_2H_5O$—* | *—$(CH_2)_4$—* | $CH_3$—* | 1~60 | *—Si$(CH_3)_2$—$CH_2$—* | $CH_3$—* |
| (h-I-73) | $C_2H_5O$—* | *—$(CH_2)_4$—* | $CH_3$—* | 1~60 | *—Si$(CH_3)_2$—$(CH_2)_2$—* | $CH_3$—* |
| (h-I-74) | $C_2H_5O$—* | *—$(CH_2)_4$—* | $CH_3$—* | 1~60 | *—Si$(CH_3)_2$—$(CH_2)_3$—* | $CH_3$—* |
| (h-I-75) | $C_2H_5O$—* | *—$(CH_2)_4$—* | $CH_3$—* | 1~60 | *—Si$(CH_3)_2$—$(CH_2)_4$—* | $CH_3$—* |

TABLE 6-2

| | $A^{h10}$ | $Z^{h10}$ | $R^{h20}$ | h10 | $Y^{h10}$ | $R^{h10}$ |
|---|---|---|---|---|---|---|
| (h-I-76) | $CH_3O$—* | *—O—* | $CH_3$—* | 1~60 | — | $CH_3$—* |
| (h-I-77) | $CH_3O$—* | *—O—* | $CH_3$—* | 1~60 | *—Si$(CH_3)_2$—$CH_2$—* | $CH_3$—* |
| (h-I-78) | $CH_3O$—* | *—O—* | $CH_3$—* | 1~60 | *—Si$(CH_3)_2$—$(CH_2)_2$—* | $CH_3$—* |
| (h-I-79) | $CH_3O$—* | *—O—* | $CH_3$—* | 1~60 | *—Si$(CH_3)_2$—$(CH_2)_3$—* | $CH_3$—* |
| (h-I-80) | $CH_3O$—* | *—O—* | $CH_3$—* | 1~60 | *—Si$(CH_3)_2$—$(CH_2)_4$—* | $CH_3$—* |
| (h-I-81) | $CH_3O$—* | *—$CH_2$—* | $CH_3$—* | 1~60 | — | $CH_3$—* |
| (h-I-82) | $CH_3O$—* | *—$CH_2$—* | $CH_3$—* | 1~60 | *—Si$(CH_3)_2$—$CH_2$—* | $CH_3$—* |
| (h-I-83) | $CH_3O$—* | *—$CH_2$—* | $CH_3$—* | 1~60 | *—Si$(CH_3)_2$—$(CH_2)_2$—* | $CH_3$—* |
| (h-I-84) | $CH_3O$—* | *—$CH_2$—* | $CH_3$—* | 1~60 | *—Si$(CH_3)_2$—$(CH_2)_3$—* | $CH_3$—* |
| (h-I-85) | $CH_3O$—* | *—$CH_2$—* | $CH_3$—* | 1~60 | *—Si$(CH_3)_2$—$(CH_2)_4$—* | $CH_3$—* |
| (h-I-86) | $CH_3O$—* | *—$(CH_2)_2$—* | $CH_3$—* | 1~60 | — | $CH_3$—* |
| (h-I-87) | $CH_3O$—* | *—$(CH_2)_2$—* | $CH_3$—* | 1~60 | *—Si$(CH_3)_2$—$CH_2$—* | $CH_3$—* |
| (h-I-88) | $CH_3O$—* | *—$(CH_2)_2$—* | $CH_3$—* | 1~60 | *—Si$(CH_3)_2$—$(CH_2)_2$—* | $CH_3$—* |
| (h-I-89) | $CH_3O$—* | *—$(CH_2)_2$—* | $CH_3$—* | 1~60 | *—Si$(CH_3)_2$—$(CH_2)_3$—* | $CH_3$—* |
| (h-I-90) | $CH_3O$—* | *—$(CH_2)_2$—* | $CH_3$—* | 1~60 | *—Si$(CH_3)_2$—$(CH_2)_4$—* | $CH_3$—* |
| (h-I-91) | $CH_3O$—* | *—$(CH_2)_3$—* | $CH_3$—* | 1~60 | — | $CH_3$—* |
| (h-I-92) | $CH_3O$—* | *—$(CH_2)_3$—* | $CH_3$—* | 1~60 | *—Si$(CH_3)_2$—$CH_2$—* | $CH_3$—* |
| (h-I-93) | $CH_3O$—* | *—$(CH_2)_3$—* | $CH_3$—* | 1~60 | *—Si$(CH_3)_2$—$(CH_2)_2$—* | $CH_3$—* |
| (h-I-94) | $CH_3O$—* | *—$(CH_2)_3$—* | $CH_3$—* | 1~60 | *—Si$(CH_3)_2$—$(CH_2)_3$—* | $CH_3$—* |
| (h-I-95) | $CH_3O$—* | *—$(CH_2)_3$—* | $CH_3$—* | 1~60 | *—Si$(CH_3)_2$—$(CH_2)_4$—* | $CH_3$—* |
| (h-I-96) | $CH_3O$—* | *—$(CH_2)_4$—* | $CH_3$—* | 1~60 | — | $CH_3$—* |
| (h-I-97) | $CH_3O$—* | *—$(CH_2)_4$—* | $CH_3$—* | 1~60 | *—Si$(CH_3)_2$—$CH_2$—* | $CH_3$—* |
| (h-I-98) | $CH_3O$—* | *—$(CH_2)_4$—* | $CH_3$—* | 1~60 | *—Si$(CH_3)_2$—$(CH_2)_2$—* | $CH_3$—* |
| (h-I-99) | $CH_3O$—* | *—$(CH_2)_4$—* | $CH_3$—* | 1~60 | *—Si$(CH_3)_2$—$(CH_2)_3$—* | $CH_3$—* |
| (h-I-100) | $CH_3O$—* | *—$(CH_2)_4$—* | $CH_3$—* | 1~60 | *—Si$(CH_3)_2$—$(CH_2)_4$—* | $CH_3$—* |

The compound (H) including a siloxane chain is more preferably represented by the following formula (h3) and the following formula (h4).

[Formula 29]

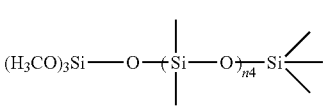

(h3)

In formula (h3), n2 is an integer of 1 to 60.

[Formula 30]

$$(H_3CO)_3Si-O-(Si-O)_{n4}-Si\Big\backslash$$

(h4)

In formula (h4), n4 is an integer of 1 to 60.

It is more preferable that n2 and n4 are integers of 2 or more, and further preferably integers of 3 or more, and more preferably integers of 50 or less, further preferably integers of 45 or less, still further preferably integers of 30 or less, and particularly preferably integers of 25 or less.

By using a predetermined amount of the compound (H) including a siloxane chain, coatability when the composition is brought into contact with the base material is improved.

Examples of the method for synthesizing the compound (H) including a siloxane chain include the methods described in Japanese Patent Laid-Open No. 2017-201009.

When the compound (H) including a siloxane chain is mixed in the composition for forming an intermediate layer, the amount of the compound (H) including a siloxane chain is, based on the whole composition of 100% by mass, for example, preferably 0.005% by mass or more, more preferably 0.01% by mass or more, and further preferably 0.03% by mass or more, and is preferably 0.3% by mass or less, more preferably 0.2% by mass or less, and further preferably 0.15 by mass or less.

When the compound (H) including a siloxane chain is mixed in the composition for forming an intermediate layer, the total amount of the polysilazane (F) and the compound (H) including a siloxane chain is, for example, based on the whole composition of 100% by mass, preferably 0.01% by mass or more, more preferably 0.1% by mass or more, and further preferably 0.3 by mass or more, and is preferably 2.6% by mass or less, more preferably 2% by mass or less, further preferably 1.5% by mass or less, and particularly preferably 1% by mass or less.

When the polysilazane (F) is mixed in the composition for forming an intermediate layer, and the metal compound (G) and the compound (H) including a siloxane chain are also mixed, the total amount of these is, based on the whole composition of 100% by mass, for example, preferably 0.3% by mass or more, more preferably 0.4% by mass or more, and further preferably 0.5% by mass or more, and is preferably 5% by mass or less, more preferably 3% by mass or less, and further preferably 1.5% by mass or less.

9. Solvent (I)

The composition for forming an intermediate layer is preferably a mixed composition in which a solvent (I) is mixed in addition to the each of the components described above.

Examples of the solvent (I) include alcohol solvents, ether solvents, ketone solvents, ester solvents, amide solvents, aliphatic hydrocarbon solvents, aromatic hydrocarbon solvents, and the like.

Examples of the alcohol solvent include, in addition to the solvents described above as examples of the solvent (E), 1-propoxy2-propanol, and the like.

Examples of the ether solvent include, in addition to the solvents described above as examples of the solvent (E), dibutyl ether and the like.

Examples of the ketone solvent include the solvents described above as examples of the solvent (E).

Examples of the ester solvent include the solvents described above as examples of the solvent (E).

Examples of the amide solvent include the solvents described above as examples of the solvent (E).

Examples of the aliphatic hydrocarbon solvent include pentane, hexane, heptane, octane, isooctane, cyclopentane, cyclohexane, cycloheptane, methylcyclohexane, mineral spirits, and the like.

Examples of the aromatic hydrocarbon solvent include benzene, toluene, xylene, chlorobenzene, dichlorobenzene, and the like.

Among these, a ketone solvent, an ether solvent, an ester solvent, and an aliphatic hydrocarbon solvent are preferable, and an aliphatic hydrocarbon solvent is more preferable.

One kind of these solvents may be used, or two or more kinds may be appropriately mixed and used. It is preferable that the solvent (I) does not contain moisture, because this allows the stability of the coating liquid to be increased, coating streakiness to be reduced, and foreign matter during coating to be reduced.

The amount of the solvent (I) is preferably, based on the whole composition for forming an intermediate layer of 100% by mass, 50% by mass or more, more preferably 80% by mass or more, further preferably 90% by mass or more, and particularly preferably 95% by mass or more. The upper limit is set according to the amounts of the polysilazane (F), the metal compound (G), the compound (H) including a siloxane chain, and added components other than these (hereinafter referred to as "third component"). A component other than the polysilazane (F), metal compound (G), compound (H) including a siloxane chain, and third component may be the solvent (I).

Examples of the third component include a catalyst.

The catalyst is not particularly limited as long as it is capable of curing polysilazane. Examples include N-heterocyclic compounds such as 1-methylpiperazine, 1-methylpiperidine, 4,4'-trimethylenedipiperidine, 4,4'-trymethylenebis(1-methylpiperidine), diazabicyclo-[2,2,2]octane, cis-2, 6-dimethylpiperazine, 6-(4-methylpiperidine)pyridine, pyridine, dipyridine, α-picoline, β-picoline, γ-picoline, piperidine, lutidine, pyrimidine, pyridazine, 4,4'-trymethylenedipyridine, 2-(methylamino)pyridine, pyrazine, quinoline, quinoxaline, triazine, pyrrole, 3-pyrroline, imidazole, triazole, tetrazole, and 1-methylpyrrolidine, amines such as methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, heptylamine, diheptylamine, octylamine, dioctylamine, trioctylamine, phenylamine, diphenylamine, and triphenylamine, 1,8-diazabicyclo[5,4,0] 7-undecene (DBU), 1,5-diazabicyclo[4,3,0]-5-nonene (DBN), 1,5,9-triazacyclododecane, 1,4,7-triazacyclononane, and the like.

Further, as the catalyst, in addition to the catalysts described above, a catalyst that acts as a hydrolysis/condensation catalyst of a hydrolyzable group bonded to a silicon atom is also preferable. Examples of such a catalyst include: acidic compounds; basic compounds; organometallic compounds; and the like. Examples of the acidic compound include inorganic acids such as hydrochloric acid, nitric acid, sulfuric acid, phosphoric acid, hydrogen peroxide, chloric acid, and hypochloric acid; and organic acids such as acetic acid, propionic acid, butyric acid, valeric acid, maleic acid and stearic acid. Examples of the basic compound include ammonia and the like. Examples of the organometallic compound include organometallic compounds having a metal element such as Al, Fe, Zn, and Sn as a central metal, such as: organoaluminum compounds such as aluminum carboxylate, an aluminum acetylacetone complex, and an aluminum ethylacetoacetate complex; organoiron compounds such as iron carboxylate (iron octylate, etc.); organozinc compounds such as zinc acetylacetonate monohydrate, zinc naphthenate, and zinc octylate; organotin compounds such as a dibutyltin diacetate complex; other organometallic compounds such as metal carboxylates including Ni, Ti, Pt, Rh, Co, Ru, Os, Pd, Ir, and the like; acetylacetonate complexes including Ni, Pt, Pd, Rh, and the like; metal fine particles of Au, Ag, Pd, Ni, Zn, Ti, and the like; metal peroxides; metal chlorides; cyclopentadienyl complexes of metals such as ferrocene and zirconosen; and the like.

The same additives as the additives optionally mixed in the composition of the present invention (composition for forming a liquid-repellent layer) may coexist in the composition for forming an intermediate layer in a range that does not impair the effects of the present invention.

As a method of bringing the composition for forming an intermediate layer into contact with the base material, the methods described above as examples of methods of bringing the composition for forming a liquid-repellent layer into contact with the base material can be adopted.

When the composition for forming an intermediate layer brought into contact with the base material in the manner described above is allowed to stand in the air at room temperature, it reacts with the moisture in the air, and decomposition and siloxy group formation proceed, thereby enabling a coating film containing a Si—O skeleton to be formed on the base material. The standing time is not particularly limited, but is preferably 1 minute or more, and more preferably 2 minutes or more. From the viewpoint of practicality, the standing time is preferably 12 hours or less, more preferably 1 hour or less, further preferably 30 minutes or less, and still further preferably 10 minutes or less.

The film thickness of the intermediate layer can be, for example, about 0.1 to 200 nm, preferably 0.2 to 100 nm, and more preferably 0.3 to 50 nm.

The contact angle of the droplets (specifically, water droplets) on the film obtained by curing the composition for forming a liquid-repellent layer of the present invention is preferably 95° or more, more preferably 100° or more, and further preferably 102° or more. This contact angle can be determined in accordance with the measurement method in the Examples described later.

The sliding speed of the droplets (specifically, water droplets) on the film obtained by curing the composition for forming a liquid-repellent layer of the present invention is preferably 20 mm/sec or more, more preferably 25 mm/sec or more, further preferably 30 mm/sec or more, much further preferably 40 mm/sec or more, and particularly preferably 60 mm/sec or more. This sliding speed can be determined in accordance with the measurement method in the Examples described later.

The film obtained by curing the composition for forming a liquid-repellent layer of the present invention exhibits a wear resistance of preferably 400 times or more, more preferably 800 times or more, further preferably 1200 times or more, much more preferably 1600 times or more, and particularly preferably 2000 times or more. This wear resistance can be determined in accordance with the measurement method in the Examples described later.

EXAMPLES

Hereinafter, the present invention will be described in more detail with reference to Examples, but the present invention is not limited by the following Examples. Modifications may be appropriately made to the present invention without departing from the gist described above and below, and all of such modifications are within the technical scope of the invention.

(Production of Composition I for Forming an Intermediate Layer)

A composition I for forming an intermediate layer was obtained by dissolving 0.15 parts by mass of Durazane (registered trademark) 1500 rapid cure (manufactured by MERCK) (polysilazane (F)), 0.09 parts by mass of tetraethoxysilane (metal compound (G)), and 0.015 parts by mass of the compound having an n10 average of 24 shown in Table 5-2 (h-I-26) (compound (H) including a siloxane chain) in 29.75 parts by mass of isooctane (solvent (I)).

The Durazane (registered trademark) 1500 rapid cure has a structural unit represented by the following formula (f4).

[Formula 31]

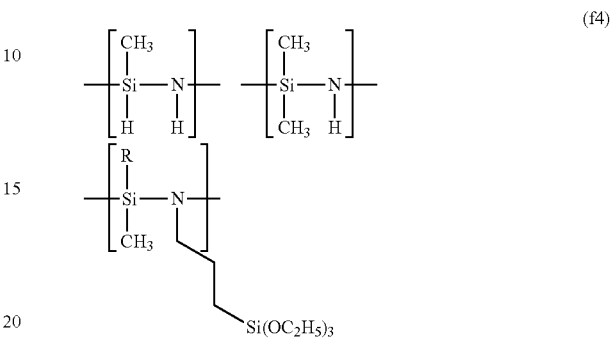

(f4)

In formula (f4), R represents a hydrogen atom or a methyl group.

Durazane (registered trademark) 1500 rapid cure (manufactured by MERCK) has a $Si(OC_2H_5)_3$ group content of 9 to 27% by mass. Further, all of the molar ratios (methyl group/hydrogen atom) of the hydrogen atoms of the SiH groups to the methyl groups of the Si—$CH_3$ groups in the structure in (f4) were 2.39. The mass ratio of the $Si(OC_2H_5)_3$ groups and the molar ratio of the hydrogen atoms to the methyl groups were determined based on the integrated value of $^1$H-NMR (400 MHz, reference: $CDCl_3$ (=7.24 ppm)). That is, the molar ratios of the SiH, $SiCH_3$, and $Si(OCH_2CH_3)_3$ in the organic polysilazane were obtained from the integrated values, and the molar ratios of the hydrogen atoms and the methyl groups were calculated. Moreover, each molar ratio was converted into a mass ratio, and the by mass of the $Si(OC_2H_5)_3$ groups included in the organic polysilazane was calculated.

(Production of Composition No. 1 for Forming Liquid-Repellent Layer)

A sample solution 1 was obtained by dissolving 0.014 parts by mass of the compound (1) having an average of n10 of 24 in (A-I-26) shown in Table 3-2 and 0.036 parts by mass of ethyl silicate 40 (average pentamer of tetraethoxysilane, $Si_5O_4$ $(OEt)_{12}$, average molecular weight about 745, manufactured by Colcote Co., Ltd.) in 0.1027 parts by mass of isopropyl alcohol, stirring the resultant solution at room temperature for 10 minutes, then adding 0.1 M aqueous acetic acid solution dropwise to the solution, and stirring the mixture at 65° C. for 2 hours. The obtained sample solution 1 was diluted with 46.7 parts by mass of isopropanol alcohol to prepare composition No. 1 for forming liquid-repellent layer was produced. The ratio (% by mass) of each compound in composition No. 1 for forming a liquid-repellent layer is as shown in Table 7 below (the same applies to other Examples and Comparative Examples).

The physical properties of the composition for forming a liquid-repellent layer and the proportion of components having a molecular weight of 5500 or more in the composition were measured by the following methods.

(a) Weight Average Molecular Weight Mw in Terms of Standard Polystyrene

The weight average molecular weight Mw of the compounds derived from at least one of the organosilicon compound (A) and the silicon compound (B) was calculated by measuring the whole mixed composition under the following conditions using gel permeation chromatography (GPC) and excluding the peaks of the solvent (E) and the catalyst (C). As a pretreatment, a solution filtered through a 0.45 μm membrane filter was used as a measurement solution.

Apparatus: Tosoh HLC-8220
Columns: TSKgel G2000 HxL+G3000 HxL+guard column
nHxLL
Eluent: tetrahydrofuran
Flow rate: 1.0 mL/min
Detector: RI detector
Column temperature: 40° C.
Injection amount: 100 μL
Molecular weight standards: Standard polystyrene 37900, 17400, 10200, 5060, 2630, and 994

(b) Ratio of Components Having a Molecular Weight of 5500 or More

The ratio of the components having a molecular weight of 5500 or more was calculated in accordance with the following procedure. In an obtained chromatogram, the total area (a) of the peaks other than the peaks derived from the solvent and the catalyst was determined. Next, the chromatogram was divided at the detection time where the molecular weight became 5500, and the area (b) of the components having a molecular weight of 5500 or more was determined. The ratio of the components having a molecular weight of 5500 or more was calculated from a ratio (b)/(a) of the obtained area.

(c) Measurement by NMR of Peak Area Ratio of Dimethylsiloxane Group to all Alkoxy Groups The integrated area ratio of the dimethylsiloxane group to all alkoxy groups was determined based on the integrated value of $^1$H-NMR (400 MHz, standard: acetone-$d_6$ (=2.052 ppm)).

<Coating Film No. 1>

A 5×5 cm$^2$ glass substrate (EAGLE XG, Corning Inc.) having a surface activated by an atmospheric pressure plasma treatment was placed so as to have an elevation angle of 45°, 500 μL of the composition I for forming an intermediate layer was poured from the upper surface of a glass substrate and dried at normal temperature and humidity for 5 minutes, and then 500 μL of the composition No. 1 for forming a liquid-repellent layer was poured thereon and air-dried at normal temperature and humidity for 1 day to form a coating film (intermediate layer and liquid-repellent layer) on the glass substrate.

(Production of Compositions No. 2 to No. 7 for Forming a Liquid-Repellent Layer)

Compositions No. 2 to No. 7 for forming a liquid-repellent layer were produced in the same manner as composition No. 1 for forming a liquid-repellent layer, except that the types and/or amounts of the organosilicon compound (A), the silicon compound (B), the catalyst (C), the water (D), and the solvent (E) for composition No. 1 for forming a liquid-repellent layer were changed to those shown in Table 7 below. In addition, ethyl silicate 48 means an average decamer of tetraethoxysilane ($Si_{10}O_9(OEt)_{22}$, average molecular weight of about 1400, manufactured by Colcote Co., Ltd.).

(Production of Composition No. 8 for Forming a Liquid-Repellent Layer)

A composition No. 8 for forming a liquid-repellent layer was produced in accordance with the procedure described in example 5 of Japanese Patent Laid-Open No. 2018-172660. In this composition No. 8, in addition to the components listed in Table 7, malonic acid was used in the amount described in example 5 of Japanese Patent Laid-Open No. 2018-172660, which was 0.014% by mass in terms of mass ratio.

TABLE 7

| | | | | Example No. | | | | | | | |
|---|---|---|---|---|---|---|---|---|---|---|---|
| | | | | Example 1 | Example 2 | Example 3 | Example 4 | Example 5 | Example 6 | Comparative Example 1 | Comparative Example 2 |
| | | | | Composition No. for forming a liquid-repellent layer | | | | | | | |
| | | | | 1 | 2 | 3 | 4 | 5 | 5 | 7 | 8 |
| Organosilicon compound (A) | | Compound (1) | % by mass | 0.02 | 0.02 | 0.03 | 0.03 | 0.02 | 0.03 | 0.03 | 0.01 |
| Silicon compound (B) | Silicon compound (bb) | Ethyl silicate, 40 | % by mass | 0.08 | 0.08 | | | 0.08 | | | |
| | | Ethyl silicate, 48 | % by mass | | | 0.08 | 0.15 | | 0.08 | 0.16 | |
| | Silicon compound (b) | Tetraethyl orthosilicate | % by mass | | | | | | | | 0.17 |
| Catalyst (C) | | Acetic acid | % by mass | 1.65 × 10$^{-4}$ | | | | | 1.65 × 10$^{-4}$ | | |
| | | Maleic acid | % by mass | | 3.96 × 10$^{-3}$ | 3.96 × 10$^{-3}$ | 3.96 × 10$^{-3}$ | 1.08 × 10$^{-2}$ | | 3.96 × 10$^{-3}$ | |
| | | Hydrogen chloride | % by mass | | | | | | | | 7.79 × 10$^{-4}$ |
| Water (D) | | | % by mass | 0.23 | 0.12 | 0.12 | 0.12 | 0.23 | 0.12 | 0.23 | 2.08 |
| Solvent (E) | | IPA | % by mass | 99.67 | 99.78 | 99.78 | 99.70 | 99.67 | 99.78 | 99.53 | 97.63 |
| Stirring conditions | | | | 65° C. 2 h | 65° C. 2 h | 65° C. 4 h | 65° C. 4 h | 65° C. 4 h | 65° C. 4 h | 65° C. 4 h | 25° C. 24 h |

TABLE 7-continued

| | | Example No. | | | | | | | |
|---|---|---|---|---|---|---|---|---|---|
| | | Example 1 | Example 2 | Example 3 | Example 4 | Example 5 | Example 6 | Comparative Example 1 | Comparative Example 2 |
| | | Composition No. for forming a liquid-repellent layer | | | | | | | |
| | | 1 | 2 | 3 | 4 | 5 | 5 | 7 | 8 |
| GPC Measurement of mixed composition | Weight average molecular weight Mw in terms of standard polystyrene | 5000 | 2500 | 3300 | 3800 | 9700 | 3600 | 15000 | 900 |
| | Area ratio of components having a molecular weight of 5500 or more % | 37.5 | 7.4 | 16.6 | 23.4 | 69.9 | 4.3 | 80.2 | 0.3 |
| NMR Measurement of mixed composition | Peak area ratio of total alkoxy groups to peak area of dimethylsiloxane group | 0.026 | 0.670 | 0.290 | 0.140 | 0.027 | 1.590 | 0.009 | 1.600 |

<Coating Films No. 2 to No. 8>

Under the same conditions as for coating film No. 1, 500 μL of the composition I for forming an intermediate layer was poured from the upper surface of a glass substrate and dried at normal temperature and humidity for 5 minutes, and then 500 μL of the compositions No. 2 to No. 8 for forming a liquid-repellent layer was poured thereon and air-dried at normal temperature and humidity for 1 day to form a coating film (intermediate layer and liquid-repellent layer) on the glass substrate.

Coating films No. 1 to No. 8 were evaluated based on the following methods.

(1) Contact Angle

The contact angle of water with respect to the coating film surface was measured by a θ/2 method with a water droplet amount of 3.0 μL using a contact angle measuring device "DM700" manufactured by Kyowa Interface Science Co., Ltd. Cases in which the contact angle was 95° or more were evaluated as having excellent water repellency.

(2) Sliding Speed

Water was dropped onto the coating film surface, and water repellency was evaluated by the sliding speed of the water droplets on the coating film surface. Specifically, using a contact angle measuring device "DM700" manufactured by Kyowa Interface Science Co., Ltd., 50 μL of water was dropped onto a coating film surface on a glass substrate tilted at 20°, the time taken for the water droplet to slide 15 mm from the initial dropping position was measured, and the sliding speed (mm/sec) of the water droplet on the coating film surface was calculated. Cases where the sliding speed of the water droplet was 20 mm/sec or more were evaluated as having excellent water repellency.

(3) Wear Resistance

Onto a coating film 2.5 mL of water was dropped, and a silicon sheet (SR-400, manufactured by Tigers Polymer Corporation) was brought into contact thereon. Then, in a state in which a load of 500 gf was applied from above on the silicon sheet, the coating film was rubbed with a silicon sheet 400 times for a distance of 20 mm under conditions of a reciprocating speed of 400 mm/min, the contact angles at three points in the center of the rubbed portion were each measured, and the number of times until two of the three points decreased to 85° or less was measured. When the number of times was 400 times or more, the wear resistance was evaluated to be excellent.

The results are shown in Table 8.

TABLE 8

| | | Example No. | | | | | | | |
|---|---|---|---|---|---|---|---|---|---|
| | | Example 1 | Example 2 | Example 3 | Example 4 | Example 5 | Example 6 | Comparative Example 1 | Comparative Example 2 |
| | | Coating film No. | | | | | | | |
| | | 1 | 2 | 3 | 4 | 5 | 6 | 7 | 8 |
| Contact angle | ° | 101.3 | 101.9 | 102.4 | 102.3 | 102.1 | 100.6 | 96.7 | 102.0 |
| Sliding speed | mm/sec | 82.0 | 71.6 | 72.2 | 70.2 | 38.6 | 22.2 | 2.9 | 3.5 |
| Wear resistance two points 85° or less) | Number of rubs | 2400 | 2400 | 2000 | 2000 | 2800 | 2000 | <400 | <400 |

In Examples 1 to 6 satisfying the requirements of the mixed composition of the present invention, good wear resistance and liquid repellency were realized, while in Comparative Example 1, in which the weight average molecular weight was too large, and Comparative Example 2, in which the weight average molecular weight was too small, wear resistance was as a result inferior. In the preparation of composition No. 8 for forming a liquid-repellent layer of Comparative Example 2, a strong acid aqueous solution was used as the catalyst, and therefore it was difficult to control the reaction. Although the mixture was stirred at a low temperature for a long time, the weight average molecular weight remained at a low value.

INDUSTRIAL APPLICABILITY

A coating film obtained using the composition for forming a liquid-repellent layer of the present invention has excellent liquid repellency and wear resistance. Therefore, a base material treated using the composition for forming a liquid-repellent layer of the present invention is useful as a base material in display devices such as touch panel displays, optical elements, semiconductor devices, building materials, automobile parts, and nanoimprint technology. In addition, a coating formed from the composition for forming a liquid-repellent layer of the present invention can be suitably used for articles such as a body in transportation machinery, such as trains, automobiles, ships, and aircraft, window glass (windshields, side windows, rear windows), mirrors, and bumpers. Furthermore, the composition for forming a liquid-repellent layer of the present invention can also be used for outdoor applications such as the external walls of a building, tents, solar power generation modules, sound insulation boards, and concrete, as well as for fishing nets, insect nets, aquariums, and the like. Still further, the composition for forming a liquid-repellent layer of the present invention can be used for a part of various members in kitchens, bathrooms, washbasins, mirrors, toilet vicinity, as well as for various indoor equipment such as chandeliers, ceramics such as tiles, artificial marble, and air conditioners. Still further, the composition for forming a liquid-repellent layer of the present invention can also be used as an antifouling treatment for jigs, inner walls, pipes, and the like in factories. Still further, the composition for forming a liquid-repellent layer of the present invention is also suitable for goggles, spectacles, helmets, pachinko (mechanical gaming machine) equipment, textiles, umbrellas, playground equipment, soccer balls and the like. Still further, the composition for forming a liquid-repellent layer of the present invention can be used as an anti-adhesive agent for various packaging materials, such as food packaging materials, cosmetic packaging materials, and pot interiors.

The invention claimed is:

1. A mixed composition comprising an organosilicon compound (A), a silicon compound (B), a catalyst (C) and a solvent (E), wherein
   the organosilicon compound (A) is an organosilicon compound in which at least one trialkylsilyl group-containing molecular chain and at least one hydrolyzable group are bonded to a silicon atom,
   the silicon compound (B) is one or more silicon compounds selected from the group consisting of a silicon compound (b) represented by the following formula (b) and a condensate (bb) thereof, and
   in a chromatogram obtained by GPC chromatography of the mixed composition, a weight average molecular weight Mw in terms of standard polystyrene of a compound derived from at least one of the organosilicon compound (A) and the silicon compound (B) is 2000 to 12000:

   $\text{Si}(X)_p(OR^b)_{4-p}$ (b)

wherein X is an alkyl group having 1 to 6 carbon atoms or a hydrogen atom, $R^b$ is an alkyl group having 1 to 6 carbon atoms, and p is an integer of 0 to 3;
   wherein the catalyst (C) is an organic acid catalyst;
   wherein the solvent (E) is 50 mass % or more of the total 100 mass % of the composition and includes an alcohol, ether, ketone, ester or amide solvent; and
   wherein an area ratio of components having a molecular weight of 5500 or more to the area of the component derived from at least one of the organosilicon compound (A) and the silicon compound (B) in GPC chromatograph measurement of the composition is 75% or less.

2. The composition according to claim 1, comprising a compound ($B_z1$) represented by the following formula (bz):

[Formula 1]

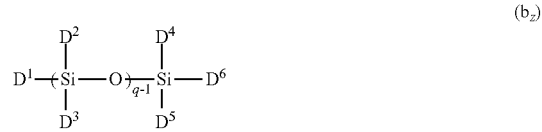
   ($b_z$)

wherein $D^1$ and $D^4$ to $D^6$ are each independently an alkyl group having 1 to 6 carbon atoms, a hydrogen atom, a hydroxy group, or an alkoxy group having 1 to 6 carbon atoms, and $D^2$ and $D^3$ are each independently an alkyl group having 1 to 6 carbon atoms, a hydrogen atom, a hydroxy group, an alkoxy group having 1 to 6 carbon atoms, or —O—,
   when $D^2$ or $D^3$ is —O—, the compound ($B_z1$) is bonded to a compound ($B_z2$), which is represented by formula (bz) and which is different from ($B_z1$), and the $D^2$ or $D^3$ that is —O— in the compound ($B_z1$) is directly bonded to Si of ($B_z2$) instead of any of $D^1$ to $D^6$ of ($B^z2$), and
   q is an average number of repetitions.

3. The composition according to claim 1, wherein a peak area ratio of total alkoxy groups to a peak area of a dimethylsiloxane group in NMR measurement of the mixed composition is 0.020 or more and less than 1.000.

4. The composition according to claim 1, wherein the organosilicon compound (A) is represented by the following formula (a1):

[Formula 2]

   (a1)

wherein each of a plurality of $A^{a1}$ independently represents a hydrolyzable group,
   $Z^{a1}$ represents a trialkylsilyl group-containing molecular chain, a siloxane skeleton-containing group, or a hydrocarbon chain-containing group,
   x is 0 or 1,
   $R^{a1}$ represents a trialkylsilyl group-containing molecular chain, and
   a hydrogen atom included in the trialkylsilyl group of $Z^{a1}$ and $R^{a1}$ is optionally replaced by a fluorine atom.

5. The composition according to claim 4, wherein the organosilicon compound (A) is represented by the following formula (a2):

[Formula 3]

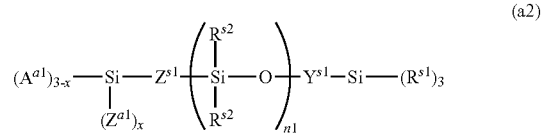
   (a2)

wherein $A^{a1}$, $Z^{a1}$, and x each have the same meaning as described above, $Z^{s1}$ represents —O— or a divalent hydrocarbon group, and —CH$_2$— included in the divalent hydrocarbon group is optionally replaced by —O—, each of a plurality of $R^{s2}$ independently represents an alkyl group having 1 to 10 carbon atoms, n1 is an integer of 1 or more, $Y^{s1}$ represents a single bond or —Si($R^{s2}$)$_2$-L$^{s1}$-, the L$^{s1}$ represents a divalent hydrocarbon group, and —CH$_2$— included in the divalent hydrocarbon group is optionally replaced by —O—, and each of a plurality of $R^{s1}$ independently represents a hydrocarbon group or a trialkylsilyloxy group.

6. A mixed composition comprising an organosilicon compound (A), a silicon compound (B) and a solvent (E), wherein the organosilicon compound (A) is an organosilicon compound in which at least one trialkylsilyl group-containing molecular chain and at least one hydrolyzable group are bonded to a silicon atom, the silicon compound (B) is one or more silicon compounds selected from the group consisting of a silicon compound (b) represented by the following formula (b) and a condensate (bb) thereof, and in a chromatogram obtained by GPC chromatography of the mixed composition, a weight average molecular weight Mw in terms of standard polystyrene of a compound derived from at least one of the organosilicon compound (A) and the silicon compound (B) is 2000 to 12000:

$$Si(X)_p(OR^b)_{4-p} \quad (b)$$

wherein X is an alkyl group having 1 to 6 carbon atoms or a hydrogen atom, $R^b$ is an alkyl group having 1 to 6 carbon atoms, and p is an integer of 0 to 3;

wherein the solvent (E) is 50 mass % or more of the total 100 mass % of the composition and includes an alcohol, ether, ketone, ester or amide solvent; and wherein an area ratio of components having a molecular weight of 5500 or more to the area of the component derived from at least one of the organosilicon compound (A) and the silicon compound (B) in GPC chromatograph measurement of the composition is 75% or less.

7. The composition according to claim 6, comprising a compound ($B_z$1) represented by the following formula (bz):

[Formula 1]

$$D^1\!\!-\!\!\begin{pmatrix}D^2\\|\\Si\\|\\D^3\end{pmatrix}\!\!-\!\!O\!\!\Big)_{q-1}\!\!\begin{matrix}D^4\\|\\Si\\|\\D^5\end{matrix}\!\!-\!\!D^6 \quad (b_z)$$

wherein $D^1$ and $D^4$ to $D^6$ are each independently an alkyl group having 1 to 6 carbon atoms, a hydrogen atom, a hydroxy group, or an alkoxy group having 1 to 6 carbon atoms, and $D^2$ and $D^3$ are each independently an alkyl group having 1 to 6 carbon atoms, a hydrogen atom, a hydroxy group, an alkoxy group having 1 to 6 carbon atoms, or —O—, when $D^2$ or $D^3$ is —O—, the compound ($B_z$1) is bonded to a compound ($B_z$2), which is represented by formula (bz) and which is different from ($B_z$1), and the $D^2$ or $D^3$ that is —O— in the compound ($B_z$1) is directly bonded to Si of ($B_z$2) instead of any of $D^1$ to $D^6$ of ($B^z$2), and q is an average number of repetitions.

8. The composition according to claim 6, wherein a peak area ratio of total alkoxy groups to a peak area of a dimethylsiloxane group in NMR measurement of the mixed composition is 0.020 or more and less than 1.000.

9. The composition according to claim 6, wherein the organosilicon compound (A) is represented by the following formula (a1):

[Formula 2]

$$(A^{a1})_{3-x}\!\!-\!\!\underset{(Z^{a1})_x}{\overset{}{Si}}\!\!-\!\!R^{a1} \quad (a1)$$

wherein each of a plurality of $A^{a1}$ independently represents a hydrolyzable group, $Z^{a1}$ represents a trialkylsilyl group-containing molecular chain, a siloxane skeleton-containing group, or a hydrocarbon chain-containing group, x is 0 or 1, $R^{a1}$ represents a trialkylsilyl group-containing molecular chain, and a hydrogen atom included in the trialkylsilyl group of $Z^{a1}$ and $R^{a1}$ is optionally replaced by a fluorine atom.

10. The composition according to claim 9, wherein the organosilicon compound (A) is represented by the following formula (a2):

[Formula 3]

$$(A^{a1})_{3-x}\!\!-\!\!\underset{(Z^{a1})_x}{\overset{}{Si}}\!\!-\!\!Z^{s1}\!\!\left(\!\!\underset{R^{s2}}{\overset{R^{s2}}{\overset{|}{Si}\!\!-\!\!O}}\!\!\right)_{\!\!n1}\!\!\!Y^{s1}\!\!-\!\!Si\!\!-\!\!(R^{s1})_3 \quad (a2)$$

wherein $A^{a1}$, $Z^{a1}$, and x each have the same meaning as described above, $Z^{s1}$ represents —O— or a divalent hydrocarbon group, and —CH$_2$— included in the divalent hydrocarbon group is optionally replaced by —O—, each of a plurality of $R^{s2}$ independently represents an alkyl group having 1 to 10 carbon atoms, n1 is an integer of 1 or more, $Y^{s1}$ represents a single bond or —Si($R^{s2}$)$_2$-L$^{s1}$-, the L$^{s1}$ represents a divalent hydrocarbon group, and —CH$_2$— included in the divalent hydrocarbon group is optionally replaced by —O—, and each of a plurality of $R^{s1}$ independently represents a hydrocarbon group or a trialkylsilyloxy group.

* * * * *